(12) United States Patent
Zacharias et al.

(10) Patent No.: US 11,601,891 B2
(45) Date of Patent: Mar. 7, 2023

(54) UPLINK TRANSMISSION TECHNIQUES FOR EXPOSURE LIMITED TRANSMISSIONS

(71) Applicant: QUALCOMM Incorporated, San Diego, CA (US)

(72) Inventors: Leena Zacharias, San Jose, CA (US); Arnaud Meylan, San Diego, CA (US); Amir Aminzadeh Gohari, Sunnyvale, CA (US); Arvind Vardarajan Santhanam, San Diego, CA (US); Shanshan Wang, San Diego, CA (US); Reza Shahidi, San Diego, CA (US); Michel Chauvin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/478,644

(22) Filed: Sep. 17, 2021

(65) Prior Publication Data

US 2022/0007300 A1  Jan. 6, 2022

Related U.S. Application Data

(62) Division of application No. 16/861,825, filed on Apr. 29, 2020, now Pat. No. 11,129,109.

(Continued)

(51) Int. Cl.
*H04W 52/18* (2009.01)
*H04W 52/14* (2009.01)
(Continued)

(52) U.S. Cl.
CPC ....... *H04W 52/146* (2013.01); *H04W 52/281* (2013.01); *H04W 52/365* (2013.01); *H04W 72/1268* (2013.01); *H04W 72/1289* (2013.01)

(58) Field of Classification Search
CPC . H04W 52/10; H04W 52/146; H04W 52/281; H04W 52/365; H04W 72/1268; H04W 72/1289
See application file for complete search history.

(56) References Cited

U.S. PATENT DOCUMENTS 10,098,127 B2   10/2018   Kumar et al.
10,425,134 B2    9/2019   Perlman et al.
(Continued)

FOREIGN PATENT DOCUMENTS

WO    WO2018172136 A1    9/2018

OTHER PUBLICATIONS

International Search Report and Written Opinion—PCT/US2020/030794—ISA/EPO—dated Nov. 17, 2020.
(Continued)

*Primary Examiner* — Hai V Nguyen
(74) *Attorney, Agent, or Firm* — Danai Nelisile Mhembere; Holland & Hart LLP

(57) ABSTRACT

Methods, systems, and devices for wireless communications are described for handling uplink grants that have associated uplink transmission that may exceed exposure limits. Exposure limits may be based on maximum permissible exposure (MPE) limits of millimeter wave transmissions and may be determined at a user equipment (UE) and provided to a base station. If the UE receives an uplink grant for a transmission in which an associated uplink transmission would exceed the exposure limits, the UE may drop the uplink transmission prior to forming a transport block, transmit control signaling to the base station to indicate the exposure limits at the UE, or combinations thereof.

20 Claims, 21 Drawing Sheets

Related U.S. Application Data

(60) Provisional application No. 62/844,081, filed on May 6, 2019.

(51) Int. Cl.
    *H04W 52/28*    (2009.01)
    *H04W 52/36*    (2009.01)
    *H04W 72/1268*    (2023.01)
    *H04W 72/12*    (2023.01)

(56) References Cited

U.S. PATENT DOCUMENTS

| | | |
|---|---|---|
| 10,716,120 B2 | 7/2020 | Yerramalli et al. |
| 10,855,422 B2 | 12/2020 | Abedini et al. |
| 11,129,109 B2 * | 9/2021 | Zacharias ............ H04W 52/10 |
| 2011/0280169 A1 | 11/2011 | Seo et al. |
| 2012/0020286 A1 * | 1/2012 | Damnjanovic ..... H04W 52/281 |
| | | 370/328 |
| 2012/0093078 A1 | 4/2012 | Perlman et al. |
| 2016/0373233 A1 | 12/2016 | Pelletier et al. |
| 2018/0167897 A1 | 6/2018 | Sampath et al. |
| 2018/0199348 A1 * | 7/2018 | Kumar ................. H04W 52/34 |
| 2019/0069303 A1 | 2/2019 | Yerramalli et al. |
| 2019/0116605 A1 | 4/2019 | Luo et al. |
| 2019/0149289 A1 | 5/2019 | Abedini et al. |
| 2019/0200304 A1 | 6/2019 | Feuersaengher et al. |
| 2019/0200365 A1 | 6/2019 | Sampath et al. |
| 2019/0222326 A1 | 7/2019 | Dunworth et al. |
| 2019/0261289 A1 | 8/2019 | Raghavan et al. |
| 2019/0297620 A1 | 9/2019 | Tian et al. |
| 2019/0320339 A1 | 10/2019 | Laselva et al. |
| 2019/0364599 A1 | 11/2019 | Islam et al. |
| 2019/0384857 A1 * | 12/2019 | Nguyen ................. G06N 20/00 |
| 2019/0394820 A1 | 12/2019 | Patil et al. |
| 2020/0021338 A1 | 1/2020 | Perlman et al. |
| 2020/0053802 A1 * | 2/2020 | Li ........................... H04W 4/70 |
| 2020/0059821 A1 | 2/2020 | Wirth et al. |
| 2020/0112927 A1 * | 4/2020 | Han .................... H04W 52/365 |
| 2020/0196305 A1 | 6/2020 | Tian et al. |
| 2020/0344686 A1 | 10/2020 | Venugopal et al. |
| 2020/0351874 A1 * | 11/2020 | Luo ................... H04B 7/15542 |
| 2020/0404660 A1 | 12/2020 | Joseph |
| 2021/0127271 A1 * | 4/2021 | Wu ..................... H04W 12/102 |
| 2022/0141662 A1 * | 5/2022 | Liao ....................... H04L 63/10 |
| | | 726/1 |
| 2022/0167335 A1 * | 5/2022 | Go ...................... H04W 52/367 |
| 2022/0225119 A1 * | 7/2022 | Li ...................... H04B 7/18513 |

OTHER PUBLICATIONS

Partial International Search Report—PCT/US2020/030794—ISAEPO—dated Aug. 1, 2020.
U.S. Appl. No. 62/844,081, filed May 6, 2019, 115 pages.

* cited by examiner

UPLINK TRANSMISSION TECHNIQUES FOR EXPOSURE LIMITED TRANSMISSIONS

CROSS REFERENCE

The present Application for patent is a Divisional of U.S. patent application Ser. No. 16/861,825 by Zacharias et al., entitled "UPLINK TRANSMISSION TECHNIQUES FOR EXPOSURE LIMITED TRANSMISSIONS" filed Apr. 29, 2020, which claims the benefit of U.S. Provisional Patent Application No. 62/844,081 by Zacharias et al., entitled "UPLINK TRANSMISSION TECHNIQUES FOR EXPOSURE LIMITED TRANSMISSIONS," filed May 6, 2019, both of which are assigned to the assignee hereof, and expressly incorporated by reference in their entirety.

BACKGROUND

The following relates generally to wireless communications, and more specifically to uplink transmission techniques for exposure limited transmissions.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM).

A wireless multiple-access communications system may include a number of base stations or network access nodes, each simultaneously supporting communication for multiple communication devices, which may be otherwise known as user equipment (UE). In some wireless communications systems, a UE may be configured to operate in multiple frequency ranges (e.g., in a sub-6 GHz frequency range or FR1, and in a millimeter wave (mmW) frequency range or FR2). For example, a UE may be configured in a dual-connectivity mode where the UE may communicate with two or more base stations using different frequency ranges. In other cases, a UE may be configured with one or more component carriers (CCs) in a first frequency range, and with one or more CCs in a second frequency range. In such systems, the UE may be scheduled to transmit uplink signals (e.g., data, control, or reference signals) using one or multiple frequency ranges. In some cases, however, one of the frequency ranges may have a limitation on the power at which the UE may transmit. Techniques for efficient uplink transmissions when a UE is power limited on one or more frequency ranges may help to enhance system efficiency.

SUMMARY

The described techniques relate to improved methods, systems, devices, and apparatuses that support uplink transmission techniques for exposure limited transmissions. Various described techniques provide for a user equipment (UE) and one or more base stations establishing communications links using multiple different frequency ranges, and the UE responding to one or more uplink grants based at least in part on an exposure threshold associated with one of the frequency ranges. In some cases, a UE may establish a dual-connectivity connection with two cell groups (e.g., a master cell group (MCG) and a secondary cell group (SCG)) that use different frequency ranges (e.g., the MCG uses a first frequency range and the SCG uses a second frequency range). The UE, in some cases, may identify an uplink power limitation based on an exposure threshold of the second frequency range (e.g., based on a maximum permissible exposure (MPE) limit of the second frequency range), and provide a power headroom report to a base station that indicates power headroom at the UE based on the exposure threshold.

In some cases, if the UE receives an uplink grant for a transmission in the second frequency range, in which an associated uplink transmission would exceed the exposure threshold, the UE may use one or more of the techniques provided herein to meet the exposure threshold. In some cases, the UE may drop the uplink transmission in the second frequency range prior to forming a transport block (TB) based on the uplink grant. In some cases, the UE may determine a maximum amount of data to transmit while complying with the MPE limit, and may indicate, to the base station, when the maximum amount has been reached. For instance, the UE may indicate, to the base station, a scaled buffer size that prevents additional uplink grants, enabling the UE to refrain from transmitting based on the MPE limit. In some cases, if the uplink transmission in the second frequency range includes both data and control information, the UE may transmit one or more transmission symbols carrying the control information, and use padding in transmission symbols that would otherwise carry the data, where the transmit power of the control information symbols is increased relative to a power of the padding symbols so as to comply with the exposure limits.

In some cases, if one or more uplink grants are received in which associated uplink transmissions would exceed the exposure threshold, the UE may transmit control information (e.g., a scheduling request (SR), buffer status report (BSR), or combinations thereof) to steer data from the second frequency range to the first frequency range. In some cases, a split bearer between the MCG and SCG may be configured, and the UE may transmit such control information only on the MCG in order to receive uplink grants only on the MCG. In other split-bearer cases, the UE may transmit different data volume indications to the MCG and SCG to steer data in accordance with current exposure limits at the UE. In some cases, different component carriers (CCs) may use the different frequency ranges, and if the UE receives uplink grants for uplink transmissions that would exceed the exposure limit, the UE may provide a restriction for one or more bearers (e.g., a voice bearer) that indicates the bearer(s) are to be transmitted using only the first frequency range.

A method of wireless communication at a UE is described. The method may include receiving, from a base station, a first uplink grant indicating a set of uplink transmission resources for an uplink transmission in a high band frequency range, and determining, based on the set of uplink transmission resources and one or more associated uplink transmission parameters, that the uplink transmission using the set of uplink transmission resources exceeds a maximum transmission power available to the UE that is based on an exposure threshold. The method may further include determining that the uplink transmission includes control information multiplexed with data, and transmitting, based on the determining that the uplink transmission includes the control information, the uplink transmission with an increased uplink transmission power for a first subset of the set of uplink transmission resources associated with the control information relative to a reduced uplink transmission power for a second subset of the set of uplink transmission resources associated with the data.

An apparatus for wireless communication at a UE is described. The apparatus may include a processor, memory coupled with the processor, and instructions stored in the memory. The instructions may be executable by the processor to cause the apparatus to receive, from a base station, a first uplink grant indicating a set of uplink transmission resources for an uplink transmission in a high band frequency range, and determine, based on the set of uplink transmission resources and one or more associated uplink transmission parameters, that the uplink transmission using the set of uplink transmission resources exceeds a maximum transmission power available to the UE that is based on an exposure threshold. The instructions may be further executable by the processor to cause the apparatus to determine that the uplink transmission includes control information multiplexed with data, and transmit, based on the determining that the uplink transmission includes the control information, the uplink transmission with an increased uplink transmission power for a first subset of the set of uplink transmission resources associated with the control information relative to a reduced uplink transmission power for a second subset of the set of uplink transmission resources associated with the data.

Another apparatus for wireless communication at a UE is described. The apparatus may include means for receiving, from a base station, a first uplink grant indicating a set of uplink transmission resources for an uplink transmission in a high band frequency range, and determining, based on the set of uplink transmission resources and one or more associated uplink transmission parameters, that the uplink transmission using the set of uplink transmission resources exceeds a maximum transmission power available to the UE that is based on an exposure threshold. The apparatus may further include means for determining that the uplink transmission includes control information multiplexed with data, and transmitting, based on the determining that the uplink transmission includes the control information, the uplink transmission with an increased uplink transmission power for a first subset of the set of uplink transmission resources associated with the control information relative to a reduced uplink transmission power for a second subset of the set of uplink transmission resources associated with the data.

A non-transitory computer-readable medium storing code for wireless communication at a UE is described. The code may include instructions executable by a processor to receive, from a base station, a first uplink grant indicating a set of uplink transmission resources for an uplink transmission in a high band frequency range, and determine, based on the set of uplink transmission resources and one or more associated uplink transmission parameters, that the uplink transmission using the set of uplink transmission resources exceeds a maximum transmission power available to the UE that is based on an exposure threshold. The code may further include instructions executable by a processor to determine that the uplink transmission includes control information multiplexed with data, and transmit, based on the determining that the uplink transmission includes the control information, the uplink transmission with an increased uplink transmission power for a first subset of the set of uplink transmission resources associated with the control information relative to a reduced uplink transmission power for a second subset of the set of uplink transmission resources associated with the data.

In some examples of the method, apparatuses, and non-transitory computer-readable medium described herein, the transmitting at the increased uplink transmission power in the first subset of the set of uplink transmission resources and at the reduced uplink transmission power in the second subset of the set of uplink transmission resources provides an aggregate transmission power that may be within the exposure threshold.

Some examples of the method, apparatuses, and non-transitory computer-readable medium described herein may further include operations, features, means, or instructions for refraining from forming a TB with the data.

In some examples of the method, apparatuses, and non-transitory computer-readable medium described herein, the transmitting further may include operations, features, means, or instructions for transmitting padding rather than the data in the second subset of the set of uplink transmission resources.

Some examples of the method, apparatuses, and non-transitory computer-readable medium described herein may further include operations, features, means, or instructions for receiving, from the base station, a second uplink grant indicating a second set of uplink transmission resources for a second uplink transmission in the high band frequency range.

Some examples of the method, apparatuses, and non-transitory computer-readable medium described herein may further include operations, features, means, or instructions for determining that the second uplink transmission at a second uplink transmission power using the second set of uplink transmission resources may be within the exposure threshold, determining whether a TB with the data may be a self-decodable TB, forming the data into the TB based on determining that the TB with the data may be self-decodable and transmitting the TB in the second uplink transmission, and dropping the second uplink transmission based on determining that the TB with the data may be not self-decodable.

Some examples of the method, apparatuses, and non-transitory computer-readable medium described herein may further include operations, features, means, or instructions for determining that the second uplink transmission using the second set of uplink transmission resources exceeds a second maximum transmission power available to the UE that may be based on the exposure threshold, determining that the second uplink transmission includes second control information multiplexed with data, and transmitting the second uplink transmission at an increased second uplink transmission power for a first subset of the second set of uplink transmission resources associated with the second control information relative to a second uplink transmission power for a second subset of the second set of uplink transmission resources associated with the data.

A method of wireless communication at a UE is described. The method may include establishing a connection with a base station, where a first traffic volume at the UE includes data to be transmitted to the base station, and receiving, from the base station, a first uplink grant indicating a set of uplink transmission resources. The method may further include determining, based on the set of uplink transmission resources and one or more associated uplink transmission parameters, that an uplink transmission of the data using the set of uplink transmission resources exceeds a maximum transmission power available to the UE that is based on an exposure threshold, calculating an adjusted traffic volume at the UE based on the set of uplink transmission resources and the data, and transmitting an indication of the adjusted traffic volume, where a size of the adjusted traffic volume limits the uplink transmission of the data based on the exposure threshold.

An apparatus for wireless communication at a UE is described. The apparatus may include a processor, memory coupled with the processor, and instructions stored in the memory. The instructions may be executable by the processor to cause the apparatus to establish a connection with a base station, where a first traffic volume at the UE includes data to be transmitted to the base station, and receive, from the base station, a first uplink grant indicating a set of uplink transmission resources. The instructions may be further executable by the processor to cause the apparatus to determine, based on the set of uplink transmission resources and one or more associated uplink transmission parameters, that an uplink transmission of the data using the set of uplink transmission resources exceeds a maximum transmission power available to the UE that is based on an exposure threshold, calculate an adjusted traffic volume at the UE based on the set of uplink transmission resources and the data, and transmit an indication of the adjusted traffic volume, where a size of the adjusted traffic volume limits the uplink transmission of the data based on the exposure threshold.

Another apparatus for wireless communication at a UE is described. The apparatus may include means for establishing a connection with a base station, where a first traffic volume at the UE includes data to be transmitted to the base station, and receiving, from the base station, a first uplink grant indicating a set of uplink transmission resources. The apparatus may further include means for determining, based on the set of uplink transmission resources and one or more associated uplink transmission parameters, that an uplink transmission of the data using the set of uplink transmission resources exceeds a maximum transmission power available to the UE that is based on an exposure threshold, calculating an adjusted traffic volume at the UE based on the set of uplink transmission resources and the data, and transmitting an indication of the adjusted traffic volume, where a size of the adjusted traffic volume limits the uplink transmission of the data based on the exposure threshold.

A non-transitory computer-readable medium storing code for wireless communication at a UE is described. The code may include instructions executable by a processor to establish a connection with a base station, where a first traffic volume at the UE includes data to be transmitted to the base station, and receive, from the base station, a first uplink grant indicating a set of uplink transmission resources. The code may further include instructions executable by a processor to determine, based on the set of uplink transmission resources and one or more associated uplink transmission parameters, that an uplink transmission of the data using the set of uplink transmission resources exceeds a maximum transmission power available to the UE that is based on an exposure threshold, calculate an adjusted traffic volume at the UE based on the set of uplink transmission resources and the data, and transmit an indication of the adjusted traffic volume, where a size of the adjusted traffic volume limits the uplink transmission of the data based on the exposure threshold.

Some examples of the method, apparatuses, and non-transitory computer-readable medium described herein may further include operations, features, means, or instructions for identifying a time interval based on a trigger associated with the uplink transmission of the data using the set of uplink transmission resources exceeding the maximum transmission power available to the UE, where the adjusted traffic volume may be calculated based on a duration of the time interval, the data to be transmitted to the base station, and the set of uplink transmission resources.

In some examples of the method, apparatuses, and non-transitory computer-readable medium described herein, calculating the adjusted traffic volume may include operations, features, means, or instructions for forming a first TB with a portion of the data to be transmitted, subtracting, from the first traffic volume, a size of the portion of the data in the first TB, and identifying, within the time interval, an end position for forming one or more additional TBs with the data based on the subtracting, where the first TB includes the indication of the adjusted traffic volume.

Some examples of the method, apparatuses, and non-transitory computer-readable medium described herein may further include operations, features, means, or instructions for refraining from forming the one or more additional TBs with a remaining portion of the data based on identifying the end position, where the one or more additional TBs may be skipped until an end of the time interval or the one or more additional TBs may be padded until the end of the time interval.

Some examples of the method, apparatuses, and non-transitory computer-readable medium described herein may further include operations, features, means, or instructions for padding the first TB based on the size of the portion of the data.

In some examples of the method, apparatuses, and non-transitory computer-readable medium described herein, the size of the adjusted traffic volume may be zero bytes.

In some examples of the method, apparatuses, and non-transitory computer-readable medium described herein, the connection may have a radio bearer that may be split over a first carrier group in a first frequency range and a second carrier group in a second frequency range, where the first traffic volume at the UE exceeds a data threshold that indicates both the first carrier group and the second carrier group may be to be used for uplink transmissions, and where calculating the adjusted traffic volume at the UE may include operations, features, means, or instructions for calculating a first adjusted traffic volume associated with the first carrier group and a second adjusted traffic volume associated with the second carrier group.

Some examples of the method, apparatuses, and non-transitory computer-readable medium described herein may further include operations, features, means, or instructions for adjusting the data threshold based on the exposure threshold, determining that the first traffic volume at the UE exceeds the adjusted data threshold, and steering data traffic to the first carrier group or to the second carrier group based on the first traffic volume at the UE exceeding the adjusted data threshold.

In some examples of the method, apparatuses, and non-transitory computer-readable medium described herein, transmitting the indication of the adjusted traffic volume may include operations, features, means, or instructions for transmitting an indication of the first adjusted traffic volume and the second adjusted traffic volume, where one or both of the first adjusted traffic volume or the second adjusted traffic volume limits the uplink transmission of the data one the first carrier group or the second carrier group based on the exposure threshold.

Some examples of the method, apparatuses, and non-transitory computer-readable medium described herein may further include operations, features, means, or instructions for determining a medium access control (MAC) buffer size for each of the first carrier group and the second carrier group, where the first adjusted traffic volume and the second adjusted traffic volume may be based on the MAC buffer size.

In some examples of the method, apparatuses, and non-transitory computer-readable medium described herein, the indication of the first adjusted traffic volume and the second adjusted traffic volume steers data traffic to the first carrier group.

In some examples of the method, apparatuses, and non-transitory computer-readable medium described herein, the first frequency range may be a sub 6 GHz frequency range and the second frequency range may be a millimeter wave frequency range.

A method of wireless communication at a UE is described. The method may include establishing a connection with a base station, the connection having a first carrier group in a first frequency range and a second carrier group in a second frequency range, where the second carrier group is configured for transmitting scheduling requests to the base station, receiving, from the base station, at least a first uplink grant indicating a set of uplink transmission resources for an uplink transmission using the second carrier group, determining, based on the set of uplink transmission resources and one or more associated uplink transmission parameters, that the uplink transmission using the set of uplink transmission resources exceeds a maximum transmission power available to the UE that is based on an exposure threshold, and transmitting, based on the determining, a scheduling request to the base station using the first carrier group that indicates the first carrier group is to be used for uplink transmissions of the UE.

An apparatus for wireless communication at a UE is described. The apparatus may include a processor, memory coupled with the processor, and instructions stored in the memory. The instructions may be executable by the processor to cause the apparatus to establish a connection with a base station, the connection having a first carrier group in a first frequency range and a second carrier group in a second frequency range, where the second carrier group is configured for transmitting scheduling requests to the base station, receive, from the base station, at least a first uplink grant indicating a set of uplink transmission resources for an uplink transmission using the second carrier group, determine, based on the set of uplink transmission resources and one or more associated uplink transmission parameters, that the uplink transmission using the set of uplink transmission resources exceeds a maximum transmission power available to the UE that is based on an exposure threshold, and transmit, based on the determining, a scheduling request to the base station using the first carrier group that indicates the first carrier group is to be used for uplink transmissions of the UE.

Another apparatus for wireless communication at a UE is described. The apparatus may include means for establishing a connection with a base station, the connection having a first carrier group in a first frequency range and a second carrier group in a second frequency range, where the second carrier group is configured for transmitting scheduling requests to the base station, receiving, from the base station, at least a first uplink grant indicating a set of uplink transmission resources for an uplink transmission using the second carrier group, determining, based on the set of uplink transmission resources and one or more associated uplink transmission parameters, that the uplink transmission using the set of uplink transmission resources exceeds a maximum transmission power available to the UE that is based on an exposure threshold, and transmitting, based on the determining, a scheduling request to the base station using the first carrier group that indicates the first carrier group is to be used for uplink transmissions of the UE.

A non-transitory computer-readable medium storing code for wireless communication at a UE is described. The code may include instructions executable by a processor to establish a connection with a base station, the connection having a first carrier group in a first frequency range and a second carrier group in a second frequency range, where the second carrier group is configured for transmitting scheduling requests to the base station, receive, from the base station, at least a first uplink grant indicating a set of uplink transmission resources for an uplink transmission using the second carrier group, determine, based on the set of uplink transmission resources and one or more associated uplink transmission parameters, that the uplink transmission using the set of uplink transmission resources exceeds a maximum transmission power available to the UE that is based on an exposure threshold, and transmit, based on the determining, a scheduling request to the base station using the first carrier group that indicates the first carrier group is to be used for uplink transmissions of the UE.

In some examples of the method, apparatuses, and non-transitory computer-readable medium described herein, a data radio bearer carrying data for the uplink transmissions of the second carrier group may be associated with the second carrier group only, and where the UE transmits a buffer status report subsequent to the scheduling request that requests a change for the data radio bearer to be split between the first carrier group and the second carrier group.

In some examples of the method, apparatuses, and non-transitory computer-readable medium described herein, the buffer status report includes a special logical channel identification field to indicate the request to change the data radio bearer.

In some examples of the method, apparatuses, and non-transitory computer-readable medium described herein, a data radio bearer carrying data for the uplink transmissions of the second carrier group may be split over the first carrier group and the second carrier group, and where a volume of uplink data at the UE may be less than a data threshold that indicates that the second carrier group may be to be used for transmitting the data.

In some examples of the method, apparatuses, and non-transitory computer-readable medium described herein, the first frequency range may be a sub 6 GHz frequency range and the second frequency range may be a millimeter wave frequency range.

A method of wireless communication at a UE is described. The method may include establishing a connection with a base station, the connection having a first component carrier in a first frequency range and a second component carrier in a second frequency range, receiving, from the base station, at least a first uplink grant indicating a set of uplink transmission resources for an uplink transmission using the second component carrier, determining, based on the set of uplink transmission resources and one or more associated uplink transmission parameters, that the uplink transmission using the set of uplink transmission resources exceeds a maximum transmission power available to the UE that is based on an exposure threshold, and transmitting, responsive to the determining that the exposure threshold is exceeded for the second component carrier, a first logical channel of a set of logical channels using only uplink transmission resources of the first component carrier.

An apparatus for wireless communication at a UE is described. The apparatus may include a processor, memory coupled with the processor, and instructions stored in the memory. The instructions may be executable by the processor to cause the apparatus to establish a connection with a base station, the connection having a first component carrier in a first frequency range and a second component carrier in a second frequency range, receive, from the base station, at least a first uplink grant indicating a set of uplink transmission resources for an uplink transmission using the second component carrier, determine, based on the set of uplink transmission resources and one or more associated uplink transmission parameters, that the uplink transmission using the set of uplink transmission resources exceeds a maximum transmission power available to the UE that is based on an exposure threshold, and transmit, responsive to the determining that the exposure threshold is exceeded for the second component carrier, a first logical channel of a set of logical channels using only uplink transmission resources of the first component carrier.

Another apparatus for wireless communication at a UE is described. The apparatus may include means for establishing a connection with a base station, the connection having a first component carrier in a first frequency range and a second component carrier in a second frequency range, receiving, from the base station, at least a first uplink grant indicating a set of uplink transmission resources for an uplink transmission using the second component carrier, determining, based on the set of uplink transmission resources and one or more associated uplink transmission parameters, that the uplink transmission using the set of uplink transmission resources exceeds a maximum transmission power available to the UE that is based on an exposure threshold, and transmitting, responsive to the determining that the exposure threshold is exceeded for the second component carrier, a first logical channel of a set of logical channels using only uplink transmission resources of the first component carrier.

A non-transitory computer-readable medium storing code for wireless communication at a UE is described. The code may include instructions executable by a processor to establish a connection with a base station, the connection having a first component carrier in a first frequency range and a second component carrier in a second frequency range, receive, from the base station, at least a first uplink grant indicating a set of uplink transmission resources for an uplink transmission using the second component carrier, determine, based on the set of uplink transmission resources and one or more associated uplink transmission parameters, that the uplink transmission using the set of uplink transmission resources exceeds a maximum transmission power available to the UE that is based on an exposure threshold, and transmit, responsive to the determining that the exposure threshold is exceeded for the second component carrier, a first logical channel of a set of logical channels using only uplink transmission resources of the first component carrier.

Some examples of the method, apparatuses, and non-transitory computer-readable medium described herein may further include operations, features, means, or instructions for transmitting control signaling to the base station that indicates the first logical channel may be to be transmitted using only uplink transmission resources of the first component carrier.

Some examples of the method, apparatuses, and non-transitory computer-readable medium described herein may further include operations, features, means, or instructions for determining an allowed serving cell restriction for a logical channel identification of the first logical channel, where the first logical channel may be to be transmitted using only a serving cell associated with the first component carrier.

In some examples of the method, apparatuses, and non-transitory computer-readable medium described herein, the allowed serving cell restriction may be transmitted only when the exposure threshold for the second component carrier may be exceeded.

Some examples of the method, apparatuses, and non-transitory computer-readable medium described herein may further include operations, features, means, or instructions for receiving, from the base station based on the transmitting, an allowed serving cell restriction for a logical channel identification of the first logical channel that indicates the first logical channel may be to be transmitted using only a serving cell associated with the first component carrier.

In some examples of the method, apparatuses, and non-transitory computer-readable medium described herein, neither of the first component carrier nor the second component carrier may be duplicated component carriers.

A method of wireless communication at a UE is described. The method may include receiving, from a base station, one or more uplink grants indicating a set of uplink transmission resources for an uplink transmission, determining, based on the set of uplink transmission resources, that the uplink transmission using the set of uplink transmission resources exceeds a threshold, identifying, based on a skipping rule, a first subset of the set of uplink transmission resources, where the skipping rule is based on the uplink transmission exceeding the threshold and a presence a power headroom report within a time interval of the uplink transmission, and transmitting the uplink transmission in at least a second subset of the set of uplink transmission resources based on the skipping rule.

An apparatus for wireless communication at a UE is described. The apparatus may include a processor, memory coupled with the processor, and instructions stored in the memory. The instructions may be executable by the processor to cause the apparatus to receive, from a base station, one or more uplink grants indicating a set of uplink transmission resources for an uplink transmission, determine, based on the set of uplink transmission resources, that the uplink transmission using the set of uplink transmission resources exceeds a threshold, identify, based on a skipping rule, a first subset of the set of uplink transmission resources, where the skipping rule is based on the uplink transmission exceeding the threshold and a presence a power headroom report within a time interval of the uplink transmission, and transmit the uplink transmission in at least a second subset of the set of uplink transmission resources based on the skipping rule.

Another apparatus for wireless communication at a UE is described. The apparatus may include means for receiving, from a base station, one or more uplink grants indicating a set of uplink transmission resources for an uplink transmission, determining, based on the set of uplink transmission resources, that the uplink transmission using the set of uplink transmission resources exceeds a threshold, identifying, based on a skipping rule, a first subset of the set of uplink transmission resources, where the skipping rule is based on the uplink transmission exceeding the threshold and a presence a power headroom report within a time interval of the uplink transmission, and transmitting the uplink transmission in at least a second subset of the set of uplink transmission resources based on the skipping rule.

A non-transitory computer-readable medium storing code for wireless communication at a UE is described. The code may include instructions executable by a processor to receive, from a base station, one or more uplink grants indicating a set of uplink transmission resources for an uplink transmission, determine, based on the set of uplink transmission resources, that the uplink transmission using the set of uplink transmission resources exceeds a threshold, identify, based on a skipping rule, a first subset of the set of uplink transmission resources, where the skipping rule is based on the uplink transmission exceeding the threshold and a presence a power headroom report within a time interval of the uplink transmission, and transmit the uplink transmission in at least a second subset of the set of uplink transmission resources based on the skipping rule.

Some examples of the method, apparatuses, and non-transitory computer-readable medium described herein may further include operations, features, means, or instructions for determining that a number of the one or more uplink grants may be less than or equal to a skipping threshold based on the skipping rule, determining to skip the first subset of the set of uplink transmission resources based on the number of the one or more uplink grants being less than or equal to the skipping threshold, filling one or more TBs associated with the second subset of the set of uplink transmission resources with data and the power headroom report, and refraining from filling one or more TBs associated with the first subset of the set of uplink transmission resources based on skipping the first subset of the set of uplink transmission resources.

Some examples of the method, apparatuses, and non-transitory computer-readable medium described herein may further include operations, features, means, or instructions for determining that a number of the one or more uplink grants may be greater than a skipping threshold based on the skipping rule, and filling, based on the number of the one or more uplink grants being greater than the skipping threshold, TBs associated with the first subset of the set of uplink transmission resources and the second subset of the set of uplink transmission resources with data, or padding, or the power headroom report, or any combination thereof. In some examples of the method, apparatuses, and non-transitory computer-readable medium described herein, transmitting the uplink transmission includes transmitting the first subset of the set of uplink transmission resources and the second subset of the set of uplink transmission resources.

Some examples of the method, apparatuses, and non-transitory computer-readable medium described herein may further include operations, features, means, or instructions for determining that a number of the one or more uplink grants may be greater than a skipping threshold based on the skipping rule, determining to skip the first subset of the set of uplink transmission resources based on the number of the one or more uplink grants being greater than the skipping threshold, and generating a virtual power headroom report for the first subset of the set of uplink transmission resources based on skipping the first subset of the set of uplink transmission resources.

Some examples of the method, apparatuses, and non-transitory computer-readable medium described herein may further include operations, features, means, or instructions for determining that a number of TBs associated with the one or more uplink grants may be less than or equal to a skipping threshold based on the skipping rule, determining to skip the first subset of the set of uplink transmission resources based on the number of the one or more uplink grants being less than or equal to the skipping threshold, filling one or more TBs associated with the second subset of the set of uplink transmission resources with data and the power headroom report, and refraining from filling one or more TBs associated with the first subset of the set of uplink transmission resources based on skipping the first subset of the set of uplink transmission resources.

Some examples of the method, apparatuses, and non-transitory computer-readable medium described herein may further include operations, features, means, or instructions for determining that a number of TBs associated with the one or more uplink grants may be greater than a skipping threshold based on the skipping rule, determining to skip the first subset of the set of uplink transmission resources based on the number of the one or more uplink grants being greater than the skipping threshold, and generating a virtual power headroom report for the first subset of the set of uplink transmission resources based on skipping the first subset of the set of uplink transmission resources.

DETAILED DESCRIPTION

Figure 1:
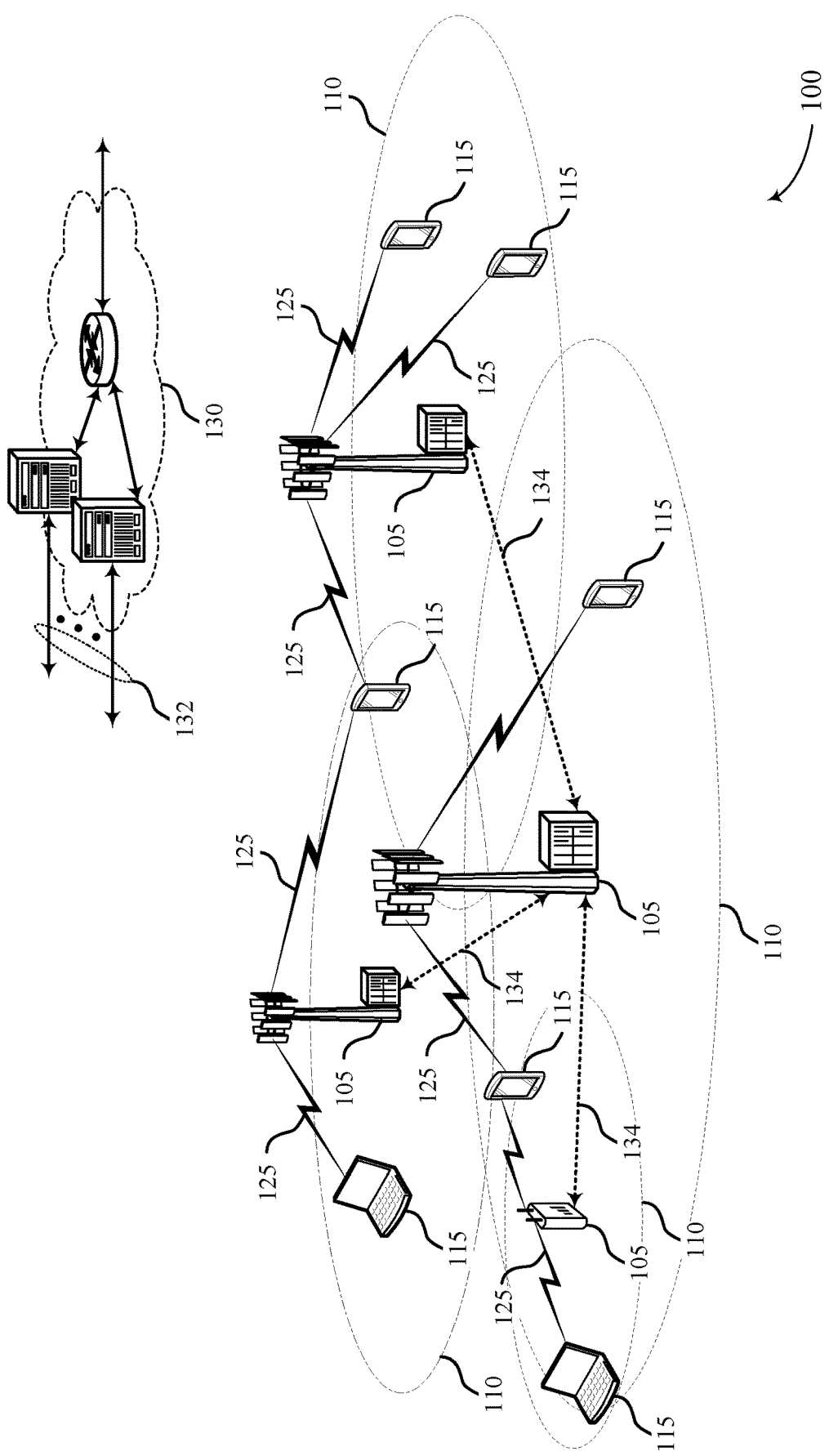
FIG. 1 illustrates an example of a system for wireless communications that supports uplink transmission techniques in accordance with aspects of the present disclosure.

In some wireless communications systems, a user equipment (UE) may be configured to operate in multiple frequency ranges (e.g., in a sub-6 GHz frequency range or FR1, and in a millimeter wave (mmW) frequency range or FR2). In some cases, a UE may be configured in a dual-connectivity mode where the UE may communicate with two or more cell groups at one or more base stations using different frequency ranges (e.g., using FR1 for a master cell group (MCG) and FR2 for a secondary cell group (SCG)). In other cases, a UE may be configured with one or more FR1 component carriers (CCs) and one or more FR2 CCs. In such systems, the UE may be scheduled to transmit uplink signals (e.g., data, control, or reference signals) using one or multiple frequency ranges. In some cases, however, one of the frequency ranges may have a limitation on the power at which the UE may transmit.

Various aspects of the present disclosure provide techniques for handling uplink grants that have associated uplink transmission that may exceed exposure limits (e.g., based on a maximum permissible exposure (MPE) limit of FR2). For example, the UE may identify an uplink power limitation based on an MPE threshold of FR2, and provide a power headroom report (PHR) to a base station that indicates power headroom at the UE based on the MPE threshold. If the UE receives an uplink grant for a transmission in FR2 in which an associated uplink transmission would exceed the MPE threshold, the UE may use one or more of the techniques provided herein to meet the MPE threshold.

Such techniques may include dropping uplink transmissions prior to forming a transport block (TB) with data to be transmitted by the UE. In such cases, the data remains in a higher-layer buffer with more flexibility on a carrier or bearer that may be used to transmit the data, rather than being placed in a hybrid acknowledgment receipt request (HARQ) buffer that is limited to a particular carrier or bearer. In some cases, the UE may determine that the FR2 uplink transmission includes both data and control information. The UE may transmit one or more transmission symbols carrying the control information and use padding in transmission symbols that would otherwise carry the data, where the transmit power of the control information symbols is increased relative to a power of the padding symbols so as to comply with the MPE limits.

Some techniques may include determining an amount of data that the UE may transmit on an uplink channel while staying within the MPE limits. For example, the UE may calculate a scaled buffer size (e.g., a fake buffer size, an internal buffer size) based on the determined amount of data available for transmission by the UE, where the scaled buffer size may enable the UE to prevent further uplink transmissions that may affect a remaining MPE budget. Specifically, the UE may decrease the scaled buffer size as each uplink transmission is processed (e.g., forming TBs with data) until the scaled buffer size reaches zero. The UE may transmit the zero-size (e.g., zero bytes) buffer to the base station to indicate that the UE has reached the limit of possible uplink transmissions and does not have enough uplink transmission power to reliably transmit subsequent uplink messages (e.g., on PUSCH). The use of the scaled buffer may enable the UE to efficiently reduce its uplink transmission power based on MPE constraints by indicating, to the base station, that no further uplink grants are requested (e.g., for transmitting buffered data). As such, the UE may avoid being scheduled to transmit in cases where the UE may not have enough uplink transmission power (e.g., based on MPE) to reliably transmit on the uplink.

Additionally or alternatively, such techniques may include transmission of control information by the UE (e.g., a scheduling request (SR), buffer status report (BSR), or combinations thereof), to steer data from FR2 to FR1. In some cases, a split bearer between the MCG on FR1 and SCG on FR2 may be configured, and the UE may transmit such control information only on the MCG in order to receive uplink grants only on the MCG. In other split-bearer cases, the UE may transmit different data volume indications to the MCG and SCG to steer data in accordance with current MPE limits at the UE. In some cases, different CCs may use the different frequency ranges, and if the UE receives uplink grants for uplink transmissions that would exceed the MPE limit, the UE may provide a restriction for one or more bearers (e.g., a voice bearer) that indicates the one or more bearers are to be transmitted using only CCs that are in FR1.

Such techniques may provide efficient mechanisms for a UE to comply with one or more transmission power limitations. In some cases, such transmission power limitations may result from exposure thresholds such as an MPE limit or a specific absorption rate (SAR) limit. In some cases, MPE limits may apply to millimeter wave (mmW) transmission frequencies (i.e., FR2 frequencies) and may limit the uplink transmission power of a UE. In some cases, an MPE inner loop may be used at the UE to determine the maximum uplink power in 10 ms periods. This maximum uplink power may be applied as a limit on a maximum power (e.g., $P_{cmax}$) reported in a PHR from the UE for FR2. In some cases, an SAR outer loop may also be used that runs over 500 ms and applies to both FR1 and FR2. Techniques as discussed herein may allow a UE to manage uplink grants in cases where a serving cell may provide uplink grants and uplink configurations that result in associated uplink transmission that may exceed the exposure limits (e.g., due to a lag between PHR reporting and network reaction, or other network behavior that results in such uplink grants). In some cases, such uplink grants may result in a UE forming a TB, but dropping the associated uplink transmission due to the exposure limits (which may result in a HARQ failure), one or more implicit retransmissions with incremented redundancy versions (RVs) that may result in a non-self-decodable transmission, or combinations thereof. Techniques such as discussed herein may provide for more efficient techniques for such uplink grants, traffic steering to non-exposure-limited frequency ranges, or combinations thereof.

Aspects of the disclosure are initially described in the context of a wireless communications system. Aspects of the disclosure are further illustrated by and described with reference to apparatus diagrams, system diagrams, and flowcharts that relate to uplink transmission techniques for exposure limited transmissions.

FIG. 1 illustrates an example of a wireless communications system 100 that supports uplink transmission techniques for exposure limited transmissions in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation NodeB or giga-NodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or other interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, for example, in the range of 300 megahertz (MHz) to 300 gigahertz (GHz). Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that may be capable of tolerating interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a carrier aggregation configuration in conjunction with component carriers operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving device is equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying some amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30{,}720{,}000$ seconds. Time intervals of a communications resource may be organized according to radio frames each having a duration of 10 milliseconds (ms), where the frame period may be expressed as $T_f=307{,}200\ T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an evolved universal mobile telecommunication system terrestrial radio access (E-UTRA) absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or discrete Fourier transform spread OFDM (DFT-S-OFDM)).

The organizational structure of the carriers may be different for different radio access technologies (e.g., LTE, LTE-A, LTE-A Pro, NR). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces). Wireless communications system 100 may support communication with a UE 115 on multiple cells or carriers (e.g., a primary cell (PCell), one or more secondary cells (SCells), or one or more primary secondary cells (PSCells)), a feature which may be referred to as carrier aggregation or multi-carrier operation. A UE 115 may be configured with multiple downlink component carriers and one or more uplink component carriers according to a carrier aggregation configuration. Carrier aggregation may be used with both FDD and TDD component carriers. Further, in some cases a UE 115 may be configured to operate in a dual connectivity mode in which the UE 115 may be scheduled for uplink transmissions to different cells or base stations 105 (e.g., each associated with a different cell group, such as a MCG or a SCG). In some cases, when operating in CA mode or dual-connectivity mode, different frequency ranges may be used for different CCs or different cell groups, and one or more exposure limits (e.g., MPE thresholds) may limit an available uplink transmission power of the UE 115.

Thus, as described in accordance with various exemplary aspects of the present disclosure, if the UE 115 receives an uplink grant for a transmission in a power limited frequency range (e.g., in a FR2 frequency range in which MPE limits are used to determine a maximum uplink transmission power), and an associated uplink transmission would exceed the exposure threshold, the UE 115 may use one or more techniques to meet the exposure threshold. In some cases, the UE 115 may drop the uplink transmission in the power limited frequency range prior to forming a TB based on the uplink grant. In some cases, if the uplink transmission in the power limited frequency range includes both data and control information, the UE 115 may transmit one or more transmission symbols carrying the control information. The UE 115 may use padding in transmission symbols that would otherwise carry the data, where the transmit power of the control information symbols is increased relative to a power of the padding symbols so as to comply with the exposure limits.

Additionally or alternatively, if one or more uplink grants are received in which associated uplink transmissions would exceed the exposure threshold, the UE 115 may transmit control information (e.g., a SR, BSR, or combinations thereof), to steer data from the power-limited frequency range to a different non-power-limited frequency range. In some cases, in a dual-connectivity mode, a split bearer between the MCG and SCG may be configured, and the UE 115 may transmit such control information only on the MCG in order to receive uplink grants only on the MCG. In other split-bearer cases, the UE 115 may transmit different data volume indications to the MCG and SCG to steer data in accordance with current exposure limits at the UE. In some cases, when operating in CA mode, different CCs may use the different frequency ranges, and if the UE 115 receives uplink grants for uplink transmissions that would exceed the exposure limit, the UE may provide a restriction for one or more bearers (e.g., a voice bearer) that indicates the one or more bearers are to be transmitted using only the non-power-limited frequency range.

Figure 2:
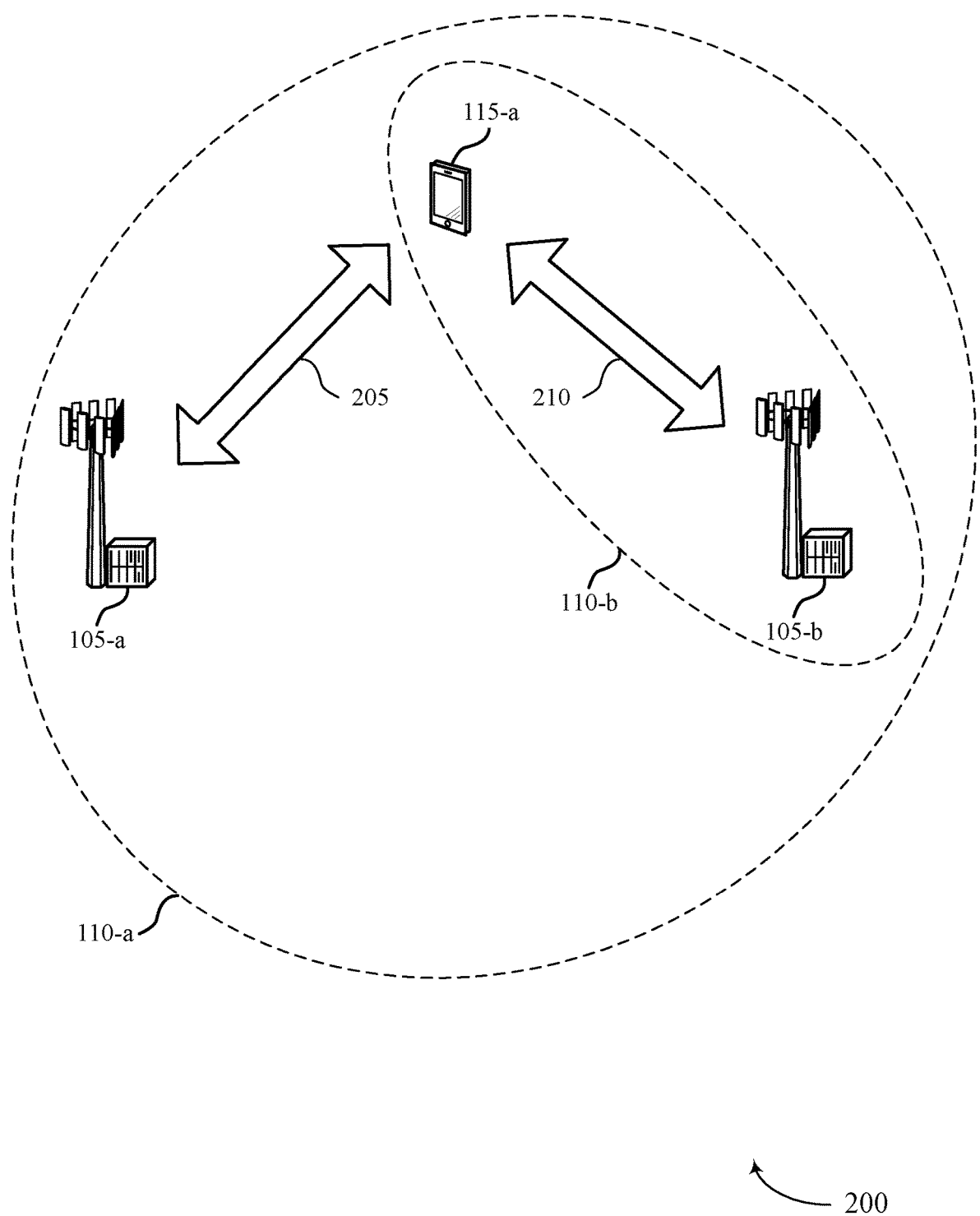
FIG. 2 illustrates an example of a portion of a wireless communications system that supports uplink transmission techniques in accordance with aspects of the present disclosure.

FIG. 2 illustrates an example of a wireless communications system 200 that supports uplink transmission techniques for exposure limited transmissions in accordance with aspects of the present disclosure. In some examples, wireless communications system 200 may implement aspects of wireless communications system 100. Wireless communications system 200 includes a first base station 105-*a* and a second base station 105-*b*, which may be examples of a base station 105 described with reference to FIG. 1. Wireless communications system 200 also includes UE 115-*a*, which may be an example of a UE 115 described with reference to FIG. 1. Wireless communications system 200 may implement aspects of wireless communications system 100. For example, UE 115-*a* in wireless communications system 200 may support efficient techniques for uplink grant management for power-limited frequency ranges.

In this example, first base station 105-*a* may provide communication coverage for a respective coverage area 110-*a*, which may be an example of a coverage area 110 described with reference to FIG. 1. In some cases, first base station 105-*a* may have a first communications link 205 with UE 115-*a*, which may use a first frequency range. For example, first communications link 205 may be an LTE communications link using a sub-6 GHz frequency range (i.e., FR1), or may be an NR communications link using FR1. While various examples discussed herein describe that LTE or NR may be used for an FR1 or FR2 communications link, it is to be understood that the techniques discussed herein are applicable to any types of radio access technologies (RATs), including where the UE 115-*a* may have multiple connections that use different RATs.

Additionally, second base station 105-*b* may provide communication coverage for a respective coverage area 110-*b*, which may be an example of a coverage area 110 described with reference to FIG. 1. In some cases, the second base station 105-*b* may have a second communications link 210 with UE 115-*a*, which may use a second frequency range. For example, second communications link 210 may be an NR communications link using a mmW frequency range (e.g., FR2).

In the example of FIG. 2, UE 115-*a* may be configured to operate in a dual connectivity mode, and UE 115-*a* may communicate with first base station 105-*a* using the first communications link 205 on one or more cells in an MCG, and with the second base station 105-*b* using the second communications link 210 on one or more cells in an SCG. In other examples, the UE 115-*a* may operate in a CA mode with the second base station 105-*b* in which the second communications link 210 may include multiple CCs in which one or more CCs are FR1 CCs and one or more CCs are FR2 CCs.

For uplink transmissions using FR2 on the second communications link 210, the UE 115-*a* may determine a maximum transmit power (e.g., $P_{cmax}$) for a particular time period (e.g., according to an MPE inner loop power determination), and may transmit an indication of the maximum transmit power in a PHR to the second base station 105-*b*, the first base station 105-*a*, or both. Based on the PHR, the UE 115-*a* may be scheduled for uplink transmissions using an uplink configuration such that uplink grants result in uplink transmissions with transmit powers in accordance with the reported maximum transmit power. In some cases, the UE 115-*a* may receive an uplink grant that identifies uplink resources in FR2 for an uplink transmission, and the UE 115-*a* may determine an uplink transmit power for the uplink transmission (e.g., based on network configured parameters, current path loss, etc.). In cases where the uplink transmit power exceeds the maximum transmit power, the UE 115-*a* may perform one or more techniques as provided herein. Further details related to uplink grant management by UE 115-*a* are described with reference to FIGS. 3 through 7.

Figure 3:
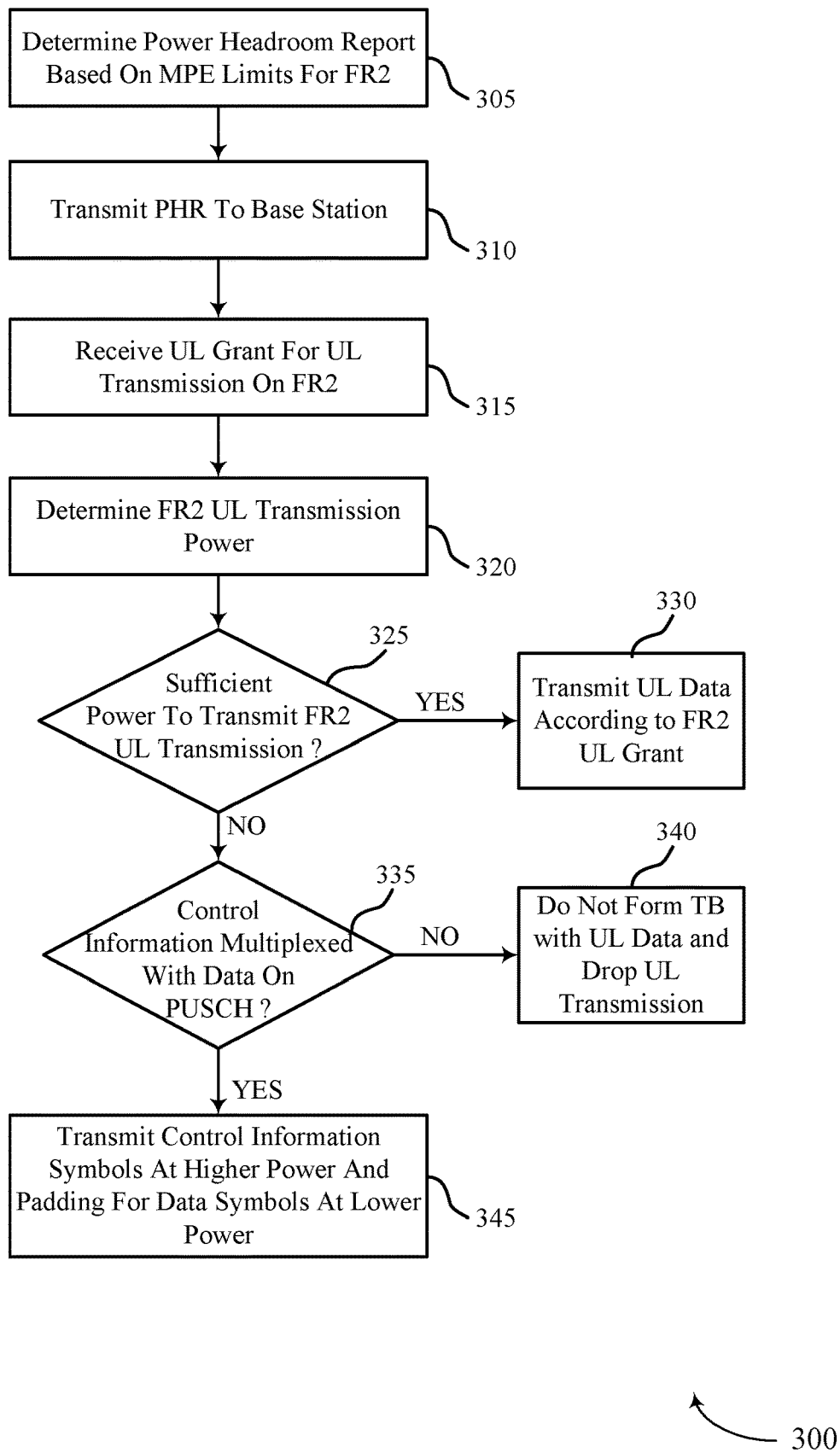
FIG. 3 illustrates an example of a flow chart that supports uplink transmission techniques in accordance with aspects of the present disclosure.

FIG. 3 illustrates an example of a flow chart 300 that supports uplink transmission techniques for exposure limited transmissions in accordance with aspects of the present disclosure. In some examples, flow chart 300 may implement aspects of wireless communications system 100 or 200. The operations of flow chart 300 may be implemented by a UE 115 or its components as described herein. For example, the operations of flow chart 300 may be performed by a communications manager as described with reference to FIGS. 7 through 10. In some examples, a UE may execute a set of instructions to control the functional elements of the UE to perform the functions described herein. Additionally or alternatively, a UE may perform aspects of the functions described herein using special-purpose hardware.

At 305, the UE may determine a power headroom report (PHR) based on MPE limits for an FR2 connection with a cell group (e.g., a SCG). In some cases, the UE may determine a maximum transmit power (e.g., $P_{cmax}$) for FR2 based on MPE limits (e.g., based on an MPE inner loop) and one or more conditions at the UE (e.g., other concurrent uplink transmissions that may occur at the UE, thermal limits at the UE, or the like). At 310, the UE may transmit the PHR to the base station.

At 315, the UE may receive an uplink grant for an uplink transmission on FR2. The uplink grant may be received at the UE in downlink control information (DCI) from a serving base station, for example. At 320, the UE may determine the uplink transmission power for the FR2 uplink transmission based on the uplink grant and one or more configured uplink transmission parameters (e.g., a number of resource blocks in the grant, a modulation and coding scheme (MCS), transmit power control parameters, power control adjustments).

At 325, the UE may determine whether sufficient power is available to transmit the FR2 uplink transmission. In some cases, the UE may make such a determination based on the reported maximum uplink transmission power, a current maximum uplink transmit power based on exposure limits, one or more other uplink power transmission determination parameters, or any combinations thereof.

If it is determined that sufficient power is available to transmit the FR2 uplink transmission in accordance with the uplink grant, the UE, at 330, may format uplink data, control information, or both into the uplink transmission and transmit the uplink transmission.

At 335, if it is determined that there is not sufficient power available to transmit the FR2 uplink transmission in accordance with the uplink grant, the UE may determine whether the uplink transmission includes control information multiplexed with uplink data on a physical uplink shared channel (PUSCH) transmission. At 340, if it is determined that no control information is to be multiplexed with uplink data, the UE may drop the uplink transmission on FR2 and not form a TB with the uplink data. By not forming the TB, the UE may maintain the associated uplink data in a higher layer buffer instead of moving the data to a HARQ buffer, which may also provide more flexibility for the data to be transmitted using a different frequency range, via a different carrier group or component carrier, etc. In some cases, the higher layer at the UE (e.g., L3) may determine the exposure limit associated with the uplink grant and prevent the grant from being provided to a lower layer (e.g., L2).

At 345, if it is determined that control information is to be multiplexed with data, the UE may format and transmit the uplink transmission with control information symbols at higher power and with padding rather than the data in the remaining symbols, where the remaining symbols are transmitted at a reduced power relative to the control symbols in order to comply with the exposure limits.

In some cases, the UE may receive one or more subsequent uplink grants, in which the UE may make similar determinations. In one example, the UE may receive a second uplink grant and determine that there is sufficient power to transmit the associated uplink transmission. In cases where the prior uplink transmission was transmitted or when control information with padding was transmitted, the UE may continue with a same TB and transmit the uplink transmission. In cases where the prior uplink transmission was dropped, the UE may form the TB in cases where the TB will be a self-decodable TB (e.g., in cases where an RV is zero such that the base station is able to decode the TB in the absence of a prior TB with the same data).

In cases where the UE receives the second uplink grant and there is still not sufficient power to transmit in accordance with the uplink grant, the UE may determine if control information and data is to be multiplexed for the second uplink transmission. If control information is not to be multiplexed, the UE may drop the transmission. If control information is to be multiplexed, the UE may continue with the same TB as used in the previous uplink transmission (e.g., in cases where there was not a power limitation or multiplexing was used in the previous uplink transmission). The UE may then multiplex the control symbols at a higher power with padding for data symbols at a lower power, such that the exposure limits are met.

Figure 4A:
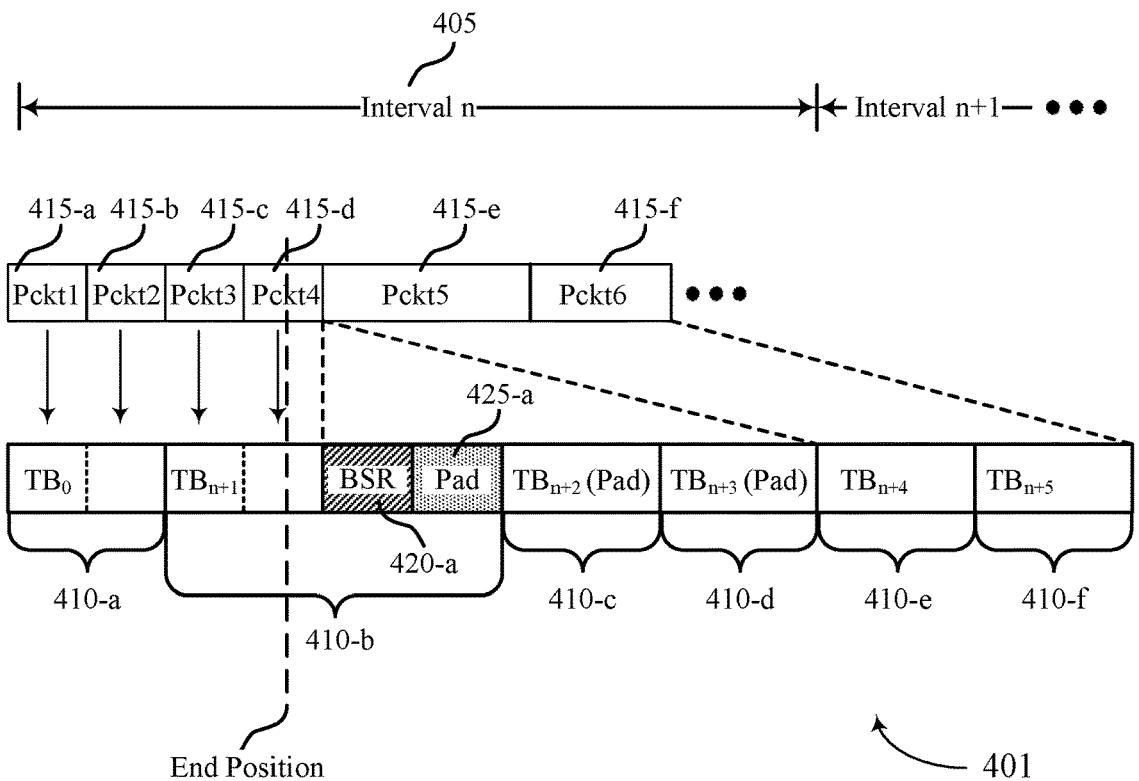
FIGS. 4A and 4B illustrate examples of transport block processing in accordance with aspects of the present disclosure.
Figure 4B:
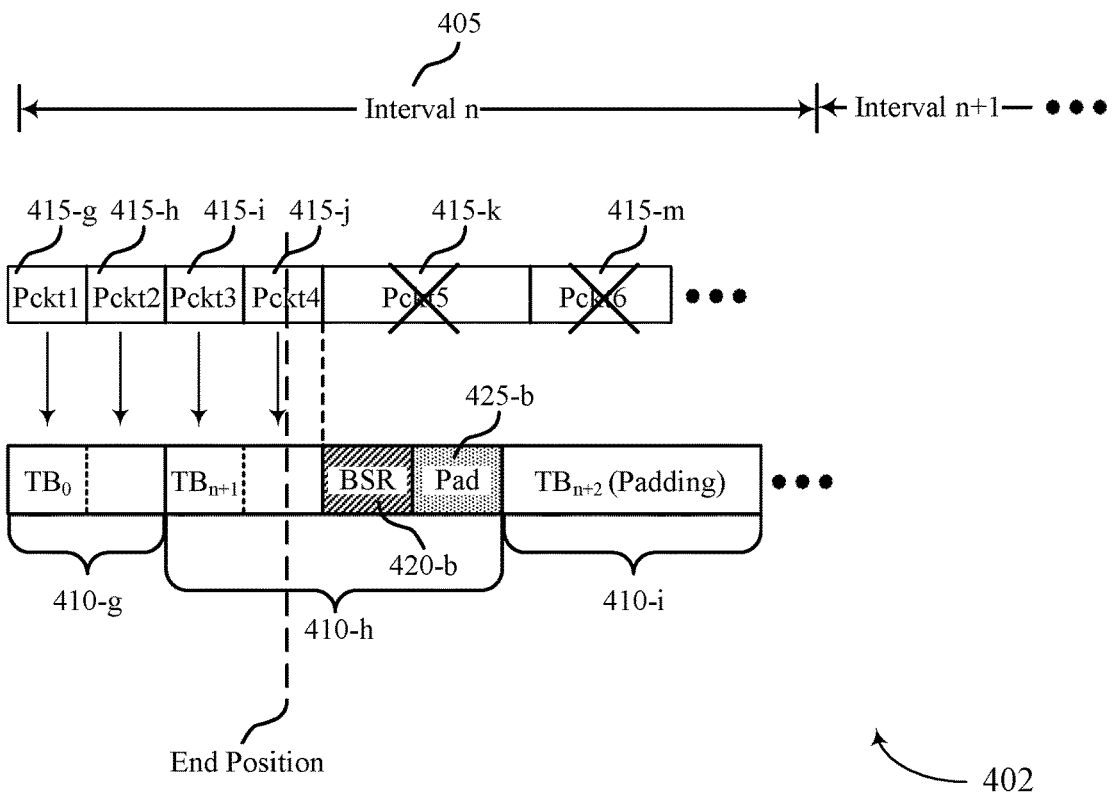

FIGS. 4A and 4B illustrate examples of transport block processing 401 and 402 that support uplink transmission techniques in accordance with aspects of the present disclosure. In some examples, transport block processing 401 and 402 may implement aspects of wireless communications systems 100 or 200. The operations of transport block processing 401 and 402 may be implemented by a UE 115 or its components as described herein. For example, a UE may utilize various modules and managers to assist in uplink transmissions, where the UE may include an MPE module (which may be an example of a power control manager 1015 described with reference to FIG. 10 and used to determine MPE power limits for the UE), an uplink MAC module (which may be an example of a MAC manager 1035 described with reference to FIG. 10 and used to implement techniques to keep the UE from exceeding a power limit), and an uplink L2 module (which may be an example of a TB manager 1025 described with reference to FIG. 10 and used to build TBs). The MPE module may use an MPE power limit to determine a maximum number of bytes that the UE may transmit during a transmission interval. The maximum number of bytes may be referred to as an MPE PUSCH throttling byte limit.

In some cases, the UE may use the MPE PUSCH throttling byte limit to calculate (e.g., via an uplink MAC module) a scaled buffer size (e.g., an internal buffer size, a fake buffer size, an indication of an adjusted traffic volume) for a portion of data to be transmitted. For example, the scaled buffer size may depend on the actual buffer size of a default data bearer, the MPE PUSCH throttling byte limit, other byte limits (e.g., a thermal byte limit), or any combination thereof. During an interval 405 (e.g., an MPE PUSCH throttling interval), the scaled buffer size may decrease (e.g., by the size of each UL grant used by the UE). In some cases, a beginning of interval 405 may correspond with an MPE PUSCH throttling trigger, where MPE PUSCH throttling may be applied to buffer status reporting. The interval 405 may also be associated with a throttling interval timer. The scaled buffer size may decrease until it reaches a threshold (e.g., zero (0) bytes), at which point subsequent BSRs may be reported as 0 bytes. In this manner, a base station may refrain from transmitting uplink grants to the UE. That is, by reporting BSRs as 0 bytes, the UE may avoid receiving uplink grants for which it does not have enough uplink transmission power to reliably transmit for an uplink grant.

In one example, the scaled buffer size may be calculated in accordance with the equation $B_{fake,FR2}(t)=\text{MIN}(B_{Actual}(t), B_{Thermal}(t), B_{MPE,MAX}(t))$, where $B_{Actual}(t)$ is the actual buffer size of the default data bearer, $B_{Thermal}(t)$ is a thermal limit (e.g., a thermal byte limit) used to throttle uplink at time, t, in bytes, and $B_{MPE,MAX}(t))$ is an MPE PUSCH throttling byte limit which may be calculated by an MPE module and used to prevent the UE from requesting more resources than an MPE threshold (e.g., an exposure threshold) can support. Here, $B_{fake,FR2}(t)$ may be the scaled buffer size, in bytes, at time, t, which may be compliant with the thermal and MPE PUSCH throttling limits. The scaled buffer size may be maintained by a MAC module, and the value of $B_{fake,FR2}(t)$ may be used in triggered B SRs. As described, as each TB 410 is filled with a payload, the UE may adjust $B_{fake,FR2}(t)$ based on a size of the data placed in a TB 410.

As illustrated by transport block processing 401, respective transport blocks (TBs) 410 (e.g., TBs 410-*a* through 410-*f*) may each be filled with one or more packets 415 (e.g., packets 415-*a* through 415-*f*). In some aspects, the UE may use the MPE PUSCH throttling byte limit to limit the amount of data to be transmitted on the TBs 410 during the interval 405. The UE may build TBs 410 (e.g., with an L2 module) according to the throttling byte limit. For example, as each TB 410 is filled with a payload, the UE may subtract the size of the data (e.g., packets 415) placed in each TB 410 from the scaled buffer size. For instance, when TB 410-*a* is filled with packets 415-*a* and 415-*b*, the UE may calculate $B_{fake,FR2}(t1)=B_{fake,FR2}(t0)-TB_0$. The UE may continue adjusting $B_{fake,FR2}(t)$ as each TB 410 is filled with one or more packets 415 until $B_{fake,FR2}(t)=0$.

When the scaled buffer size ($B_{fake,FR2}(t)$) reaches zero (e.g., 0 bytes), the UE may determine an end position within the interval 405. Specifically, the end position within interval 405 may coincide with the UE calculating $B_{fake,FR2}(t2)=B_{fake,FR2}(t1)-TB_0=0$, after using packets 415-*c* and 415-*d* to fill TB 410-*b*. At the end position, the UE may refrain from adding new packets 415 to TBs 410 (e.g., TB 410-*b*) after the end position. Further, the end position may trigger a padding BSR 420-*a* (e.g., a zero-byte BSR, a scaled BSR), and the UE may include the padding BSR 420-*a* in TB 410-*b* following the end position. In some cases, if space remains in the TB 410-*b*, padding bytes 425-*a* may be included in TB 410-*b*. That is, the UE may fill a last TB 410 (based on the end position or end time) with a zero-byte BSR 420-*a* and as many packets 415 as possible, ending at a packet boundary, where the UE may add padding 425-*a* after the last packet 415. The zero-byte padding BSR 420-*a* may indicate, to the base station, that the UE is not able to transmit any more data (e.g., based on an MPE budget) and that the UE should not be scheduled for any subsequent uplink grants.

In some cases, the UE may fill remaining TBs 410 (e.g., TBs 410-*c* and 410-*d*) in the interval 405 with padding until the end of the MPE PUSCH throttling interval 405, or the MPE byte limit is lifted, or disabled, or both, or until an MPE PUSCH throttling trigger applies a different byte limit. As such, the UE may refrain from inserting traffic (e.g., from the default bearer) in TBs 410 that occur after the end position (e.g., TB 410-*c* through TB 410-*f*). Instead, TBs 410-*c* and 410-*d* may be filled with data from other bearers, or may be padded. Padding the TBs 410-*c* and 410-*d* may reduce power consumption at the UE and, in some cases, may save MPE energy. In some examples, padding the TBs 410-*c* and 410-*d* such that the UE uplink transmissions are less than 100 percent of the possible UE uplink transmissions configured by the base station may create an on-off transmission pattern on the uplink. This on-off transmission pattern may also be referred to as a duty cycle.

Further, limiting uplink transmissions according to the MPE PUSCH throttling limit may enable the UE to request only data that can be supported in the MPE PUSCH throttling interval 405 (e.g., such that the data does not exceed an MPE limit), after which the uplink transmitter is suppressed until enough MPE energy is available to restart uplink transmissions. In some examples, not all MPE bytes may be transmitted in a given interval 405, or the MPE bytes may use less energy than originally estimated. In these cases, the unused MPE energy may be accumulated (e.g., in the MPE module) and may be factored into the next MPE PUSCH throttling interval 405.

In some examples, the UE may determine the end position only for a default internet bearer, while other bearers (e.g., SRB, IMS, or the like) may continue to be used to populate TBs 410. In other examples, high-priority traffic (e.g., control, IMS, or the like) may not be limited by the throttling byte limit and may be used to fill the TBs 410, while reserving space for a padding BSR 420-*a*.

After the MPE PUSCH throttling interval 405 has passed, the UE (e.g., via an uplink MAC module) may reapply the MPE PUSCH throttling byte limit at the beginning of the next MPE PUSCH throttling interval. In some cases, after the reapplication, the scaled buffer size may be non-zero, and the UE may trigger a new data indication to begin reporting the BSR. For example, the UE may fill TBs 410-*e* and 410-*f* with packets 415-*e* and 415-*f*. The UE may continue to insert payloads into TBs 410 until the scaled buffer size again reaches zero (e.g., during the corresponding interval 405).

In some cases, the UE may have an uplink thermal throttling interval and an uplink thermal throttling byte limit in addition to the MPE PUSCH throttling interval 405 and MPE PUSCH throttling byte limit. In such cases, the UE may maintain the number of used or remaining throttling bytes for both intervals to correctly update or limit the scaled buffer size.

In some cases, the UE may be configured with split bearers (e.g., to use multiple different RATs), and the MPE PUSCH throttling byte limit may affect an uplink MAC internal buffer size allocation per technology. For example, the UE may limit the scaled buffer size, per technology, based on the MPE PUSCH throttling byte limit. Put another way, the UE may adjust the scaled buffer for each carrier group of a split data bearer. Further, the scaled buffer size may be updated (e.g., decreased) for a UE configured with split bearers in the same manner as a non-split bearer case. However, the UE may maintain a scaled buffer size variable for each carrier group of the split bearer. Additionally, if a UE configured with split bearers has an MPE PUSCH throttling byte limit and interval as well as an uplink thermal throttling byte limit and interval, the UE may maintain the number of used or remaining bytes for both intervals per carrier group.

FIG. 4B illustrates another example of filling a TB 410 (e.g., the TB 410-*h* encompassing the end position within an interval 405). As illustrated, a UE may attempt to fill multiple TBs 410 (e.g., TB 410-*g* through TB 410-*i*) with data packets 415 (e.g., packets 415-*g* through 415-*m*). However, after an end position is determined within the interval 405, the UE may fill the TBs 410 with as many packets 415 as possible while saving space for a zero-byte padding BSR 420-*b*. In some cases, the UE may fill the last TB (e.g., TB 410-*h*) with complete packets 415-*i* and 415-*j* while maintaining space for a padding BSR 420-*b* and corresponding header. For example, if the end position is within a packet 415-*j* and there is space in the TB 410-*i* for the complete packet 415-*j* and the BSR 420-*b*, the UE may place the packet 415-*j* completely in the TB 410-*h*. Alternatively, if the end position segments the packet 415-*j*, the UE may stop filling the TB 410-*h* at the packet 415-*i* before segmented packet 415-*j* to retain room for the padding BSR 420-*b*. In any case, if there is space remaining in the last TB 410-*h*, the UE may fill the rest of the TB 410-*h* with padding 425-*b*. TBs 410 that occur after the end position (e.g., TB 410-*i*) may be filled with padding until the next MPE PUSCH throttling interval begins. Further, packets 415-*k* and 415-*m* may not fit entirely in TB 410-*h*, and because the end position has been established for the interval 405, these packets 415 may not be included in TBs 410 until a later time (e.g., until a next interval 405, or when an MPE byte limit is lifted/disabled, or a MPE PUSCH throttling trigger applies a different limit, etc.). Further, the remaining TBs 410 (e.g., TB 410-*i*) may be filled with padding until the end of the interval 405.

The described techniques may be implemented for both non-split bearer UEs and split bearer configured UEs. For non-split bearer configured UEs, the UE may adjust the BSR using the equation $B_{fake,FR2}(t)=MIN(B_{Actual}(t), B_{Thermal}(t), B_{MPE,MAX}(t))$, as described herein. Accordingly, as each TB 410 is filled with payload, the UE may subtract the size of the data placed in the TB 410 from the buffer size. When the fake/internal buffer size reaches 0 bytes, a padding BSR (e.g., an indication of an adjusted traffic volume) may be triggered and the 0 byte BSR may be placed in the TB 410. If space remains in the TB 410, padding shall be used to fill the remaining portion of the TB 410.

In some cases, non-split bearer configured UEs may apply MPE and thermal limits when corresponding timescales/offsets are different. For instance, when a PUSCH thermal throttling feature's interval/offset are different from an MPE PUSCH throttling feature's interval/offset, a remaining number of bytes of each feature may be tracked. When a trigger is received or a byte limit is being re-applied at the beginning of a new interval, the other remaining number of bytes of the other feature shall be used to determine the scaled buffer size in place of the byte limit to continue the byte countdown for the other feature.

For split bearer configured UEs, an internal split bearer threshold may be maintained (e.g., UL-DataSplitThreshold-Internal). The threshold may be used override a network-configured threshold (e.g., UL-DataSplitThreshold). The MPE PUSCH throttling may indicate that a MPE PUSCH throttling byte limit is in effect and rely on the internal split bearer threshold to determine a buffer size allocation (e.g., per RAT), and may limit scaled buffer sizes according to the MPE PUSCH throttling byte limit. For the internal uplink buffer size (e.g., MAC buffer) allocation per technology, the UE may utilize the latest actual buffer size and compare the actual buffer size to the internal split bearer threshold. If the actual buffer size is less than internal split bearer threshold, the technology (e.g., RAT) associated with a carrier group is used. However, when the internal split bearer threshold is satisfied, data may be split across multiple carrier groups, which may be associated with different RATs.

Following the scaled buffer size allocation, MPE PUSCH throttling and thermal throttling may be used to limit scaled buffer sizes of each carrier group, for example, to ensure each respective technology conforms to MPE and does not cause modem overheating. In some cases, the UE may maintain the scaled buffer sizes, for each technology, and decreases the scaled buffer sizes as uplink grants are received on each technology. The scaled buffer sizes are used to report BSRs, for each technology, when the BSRs are triggered. Thus, for a split bearer configured UE, the scaled buffer size may be updated (decreased) the same way the scaled buffer is decreased for UEs without the split bearer configuration. Here, there may be multiple scaled buffer variables to decrease, for example, one for a first carrier group (e.g., associated with FR2) and one for a second carrier group (e.g., associated with FR1).

In some examples, the internal split bearer threshold may be adjusted (e.g., the UE may override a configured threshold), and data may be steered to a carrier group based on a buffer size exceeding the adjusted threshold. In particular, the internal split bearer threshold may be overridden and adjusted (e.g., decreased) to zero, where the adjustment may be based on an MPE budget. When uplink data at the UE exceeds the adjusted (e.g., zero) threshold, the UE may steer data from the first carrier group (e.g., associated with FR2) to the second carrier group (e.g., associated with FR1) (or vice versa).

In some aspects, the UE may refrain from forming one or more TBs 410 with data, such that the UE may, for example, skip one or more unused TBs 410 (e.g., 410-*c* and 410-*d* or 410-*i*) within the interval 405 (e.g., instead of padding the TBs 410). As an illustrative example, the UE may receive one or more grants for TBs 410 that the UE may not use. By skipping one or more TBs 410, the UE may avoid unnecessary power consumption, avoid utilizing available MPE energy (e.g., energy that accounts towards an MPE budget), and avoid additional processing power and/or time on TBs 410 that the UE may not need or be able to use. In this regard, the UE may avoid padding the TBs 410 (e.g., remaining TBs 410) that may not be used.

The TBs 410 the UE may not use may be based on unforeseeable or unpredictable uplink grants received at the UE, and the UE may determine to refrain from filling the TBs 410 with data (e.g., skip the TBs 410) based on dynamically changing parameters that occur. As an example, an MPE sensor at the UE may not have detected parameters that affect MPE calculation (such as the presence of human tissue), and the UE may have reported a larger buffer size (e.g., compared to when the presence of the human tissue is accounted for). The UE may later detect the human tissue, or there may have been an MPE update, which may limit the UEs uplink power based on the updated MPE. As such, the UE may not be able to transmit, or may only be able to transmit a small amount of data (e.g., high priority data) based on the updated parameters. In other examples, after transmitting an indication of the larger buffer size, the UE may receive multiple downlink transmissions for which the UE transmits feedback (e.g., HARQ-ACK) messages, and which consume a portion of the UE's MPE budget. As such, the UE may not be able to transmit various information on the uplink based on the reduced MPE budget, which may also affect or limit communications performance between the UE and a base station. In yet other examples, as described above, the UE may set an end position for MPE PUCCH throttling, and one or more TBs 410 may not be used due to the location/timing of the end position (e.g., within TB 410-*b*, 410-*h*), which the UE may not have predicted or estimated beforehand.

The UE may additionally or alternatively be subject to errors associated with uplink scheduling, where the UE may receive one or more uplink grants that the UE is unable to use. In particular, a base station may inadvertently over-grant the UE with uplink grants (e.g., when the base station performs functions that are otherwise-intended to be beneficial to the UE, such as providing additional grants to reduce latency or flush the UE's buffer(s)), which may affect the available power the UE may use with relation to the MPE budget. In other examples, the base station may have reduced capability (e.g., limited processing power), and simplified scheduling procedures (e.g., as compared to those performed by other base stations) may use aged or obsolete scheduling parameters (such as a PHR), or the scheduling parameters may be inaccurate due to discretization, processing delays, and the like. As such, the base station may over-grant the UE, resulting in TBs 410 that the UE may be unable to use (e.g., due to MPE constraints).

Thus, while the UE may pad one or more TBs (e.g., TBs 410-c, 410-d, 410-i, etc.), the UE may save power by skipping the TBs 410, which may avoid the filling of the TBs 410 with padding bits. Here, the UE may skip one or more TBs 410 that may not be used by the UE (such as TBs 410 that may only include padding). In such examples, when the UE is preparing to skip at least one TB 410, the UE may re-calculate a maximum transmission power level and update a PHR that is to be transmitted.

In some examples, the UE may identify that the recalculation of the maximum transmission power level and the updating of the PHR may not be supported (e.g., such operations may obviate the TB filling timeline, or exceed a threshold, or the like), and the UE may not be able to skip, or refrain from filling, one or more uplink grants based on the recalculation of the maximum transmission power level and updating of the PHR not being supported. In such cases, the UE may skip TBs 410 based on a rule. For instance, the rule may indicate that the UE may not skip TBs 410 in a time period (e.g., slot) when the time period includes at least one TB 410 that includes data and a PHR and a TB 410 was to be skipped because it included padding, and a number of carriers with uplink data (e.g., via PUSCH) may satisfy a threshold (e.g., a maximum skipping threshold, or SKIP_MAX_CC). In some examples, such a threshold may be set to two carriers (e.g., by default), or may be set to other values. Using such a rule may enable the UE to avoid recalculating a maximum transmission power level and PHR, and the UE may, in some cases, transmit one or more TBs 410 that include padding. Because a PHR may not be triggered with high frequency, the recalculation of the maximum transmission power level for the PHR may not occur often, thereby minimizing power consumption at the UE when performing such recalculations.

In some cases, the UE may have more uplink resources for data than it may use. The UE may accordingly determine TBs 410 to skip using a rule that is based on whether a PHR is scheduled to be transmitted (e.g., in a TB 410 in a slot). For example, there may be no PHR triggered for a slot, and the UE may skip one or more TBs 410 and recalculate the transmission power for any transmitted TBs 410 without updating the PHR. In cases where a PHR is to be transmitted, the UE may determine whether a number of uplink grants or a number of TBs 410 satisfies a threshold (e.g., a maximum skipping threshold, or SKIP_MAX_CAR), For example, if the number of uplink grants or the number of TBs 410 is less than or equal to the skipping threshold, the UE may skip or use TBs 410 without updating the PHR. In such cases, the UE may recalculate a transmission power for the TBs that are used for an uplink transmission. Alternatively, if the threshold is satisfied (e.g., the number of uplink grants are greater than the skipping threshold), the UE may refrain from skipping any TBs 410, and may instead fill TBs 410 with uplink data and the PHR, where any unused portions of the TBs 410 may be filled with padding. In such cases, the UE may transmit all TBs 410 of the uplink transmission. In other examples, the UE may calculate a virtual PH value for a hypothetical uplink transmission and generate a virtual PHR for any skipped TBs 410 (or skipped component carriers). Additionally or alternatively, the UE may determine to delay the PHR until a future transmission. As an example, the UE may determine that there are too many grants in the current slot for the UE to recalculate the PHR within a TB generation or building timeline, and the UE may delay transmitting the PHR, for example, until a future slot with fewer grants.

Figure 5:
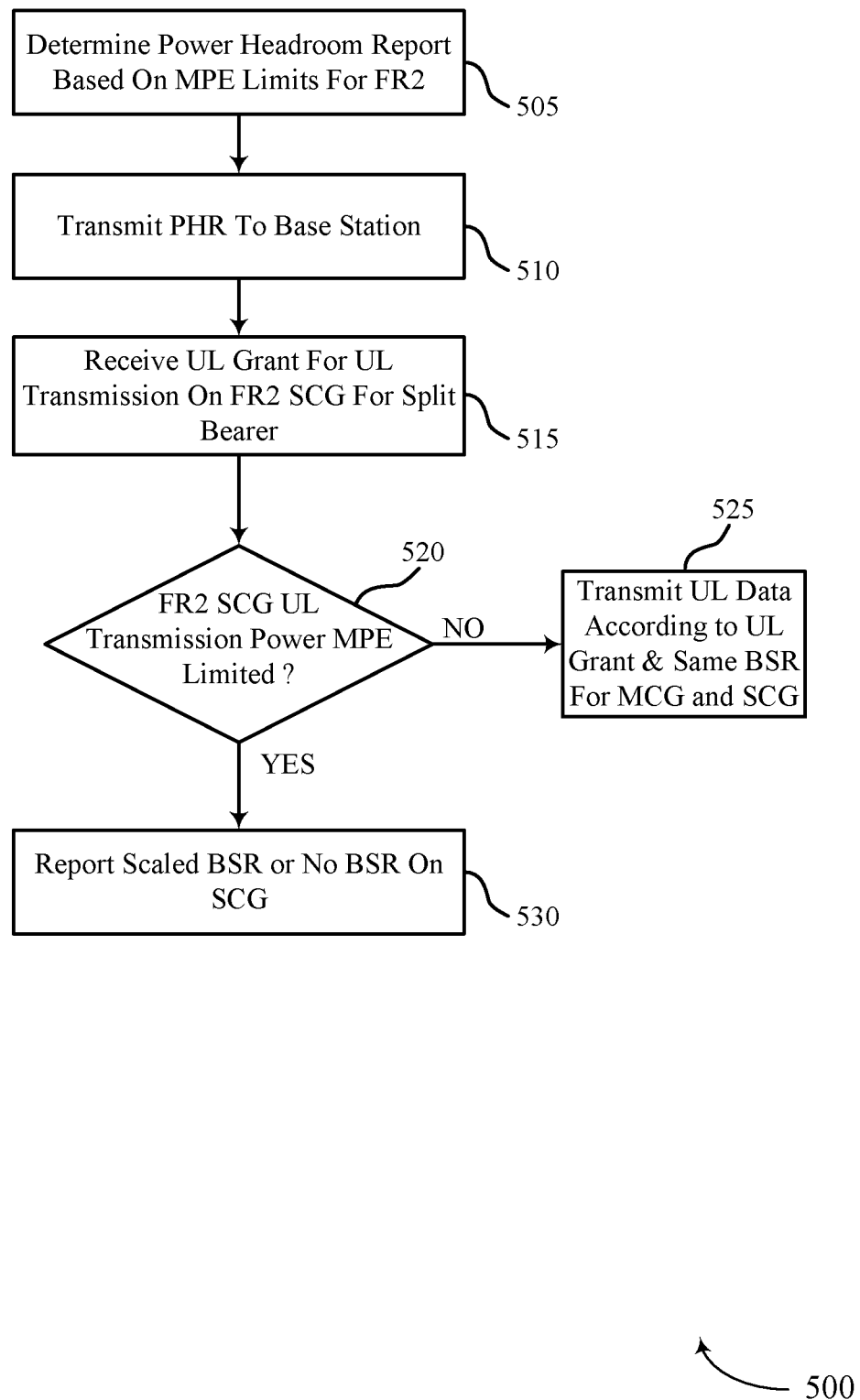
FIGS. 5 through 7 illustrate examples of flow charts that support techniques in accordance with aspects of the present disclosure.

FIG. 5 illustrates an example of a flow chart 500 that supports uplink transmission techniques for exposure limited transmissions in accordance with aspects of the present disclosure. In some examples, flow chart 500 may implement aspects of wireless communications system 100 or 200. The operations of flow chart 500 may be implemented by a UE 115 or its components as described herein. For example, the operations of flow chart 500 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 505, the UE may determine a PHR based on MPE limits for an FR2 connection with a cell group (e.g., an SCG). In some cases, the UE may determine a maximum transmit power for FR2 based on MPE limits (e.g., based on an MPE inner loop) and one or more conditions at the UE (e.g., other concurrent uplink transmissions that may occur at the UE, thermal limits at the UE). At 510, the UE may transmit the PHR to the base station.

At 515, the UE may receive an uplink grant for an uplink transmission on FR2. In this example, the UE may operate in a dual-connectivity mode in which a split bearer is configured on both FR1 and FR2. The uplink grant may be received at the UE in DCI from a serving base station, for example.

At 520, the UE may determine whether the uplink transmission power for the FR2 uplink transmission based on the uplink grant and one or more configured uplink transmission parameters is limited by MPE. In cases where the FR2 transmission is not power limited the UE, at 525, may transmit the uplink data according to the uplink grant, and the UE may report a same data volume in BSRs that are transmitted for both FR1 and FR2 (e.g., a BSR for an MCG and for an SCG that use different frequency ranges).

At 530, if the UE determines that the FR2 uplink transmission is power limited due to exposure limits, the UE may transmit a scaled BSR, or no BSR, of the SCG associated with FR2. In some cases, the scaled BSR for FR2 may indicate a reduced data volume relative to an unscaled BSR for FR1. In some cases, the amount of scaling of the data volume reported in the FR2 BSR may be dependent upon the maximum uplink power of the UE based on the MPE limits. Thus, the scaled BSR may provide for traffic shaping or steering of data from the FR2 SCG to an FR1 MCG, for example. In other cases, the UE may not transmit a BSR at all that is associated with FR2, and thus subsequent uplink grants from the base station may be for FR1 only. In some cases, such techniques may be used when the UE identifies that a power headroom reporting frequency is insufficient to keep up with relatively fast changing MPE limitations, when a number of HARQ failures of FR2 exceeds a predetermined value, or any combinations thereof, where it may be desirable to avoid the SCG for data altogether.

In some cases, a technique such as described in the example of FIG. 5 may be implemented for the split bearer only if an amount of data to be transmitted is greater than a configured threshold value that indicates data is to be transmitted using a FR2 primary path. In such a case, the UE may effectively override the configured threshold value and change the primary path to the FR1 path, and the base station may thus provide further uplink grants for the split bearer on FR1 only.

In some cases, different values of data volumes at the UE may be reported in BSRs for FR1 and FR2. In some cases, the UE may report such different values in the associated BSRs to help shape traffic between FR1 and FR2. For example, the UE may determine that FR1 transmissions consume less power than FR2 transmissions, and may scale a BSR report value for FR2 to reduce uplink grants on FR2 and thus conserve power. In some cases, the base station may receive the BSRs that report different values, and may identify that the UE is requesting to steer traffic or shape traffic to favor FR1, and may schedule uplink transmissions in accordance with the request. In some cases, such a traffic steering request may be implicitly recognized at the base station based on the PHR or different reported BSR values. In other cases, the UE may transmit an explicit indication (e.g., in a MAC-CE) to the base station to indicate the MPR limitation or request for traffic steering.

Figure 6:
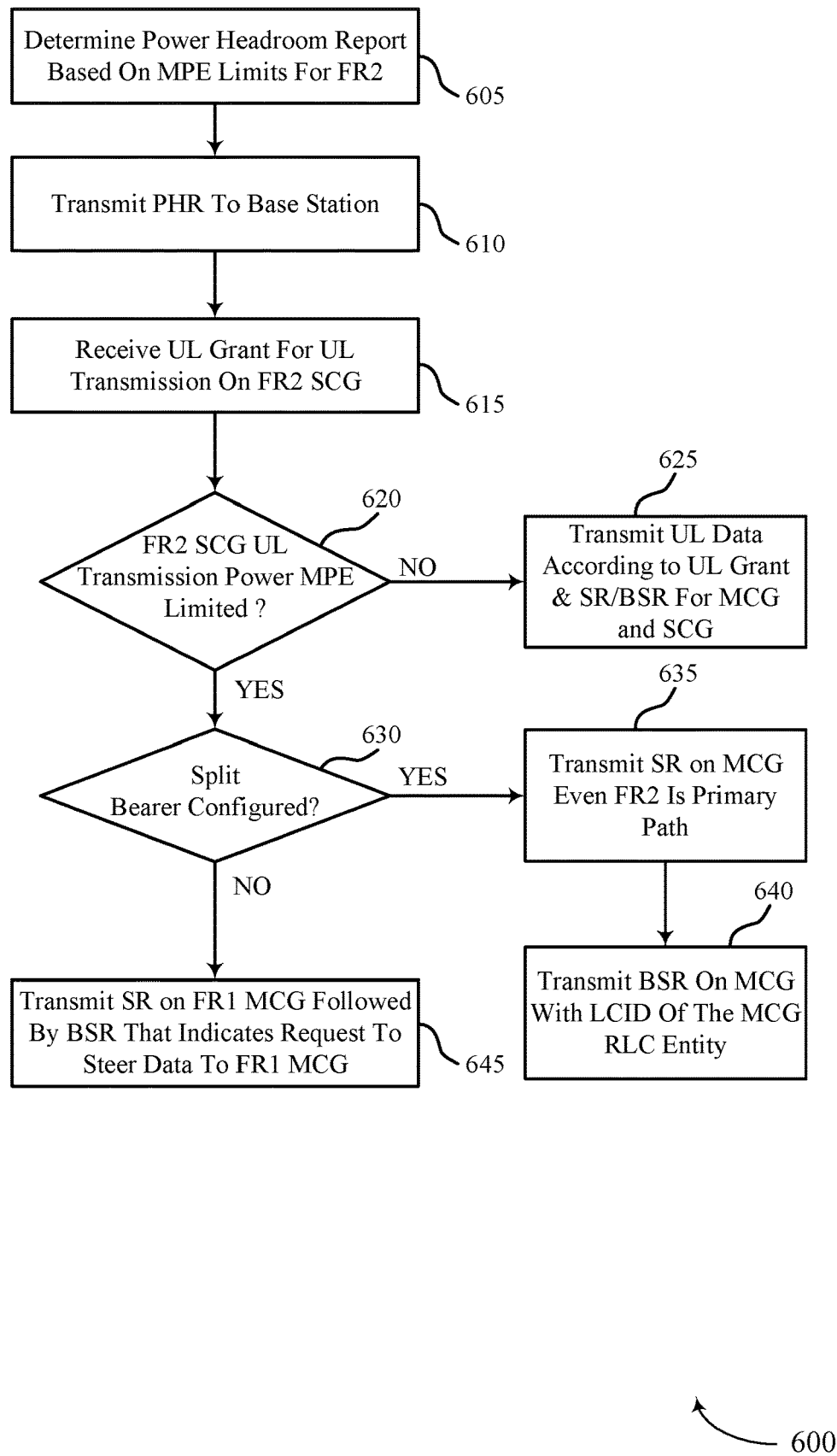

FIG. 6 illustrates an example of a flow chart 600 that supports uplink transmission techniques for exposure limited transmissions in accordance with aspects of the present disclosure. In some examples, flow chart 600 may implement aspects of wireless communications system 100 or 200. The operations of flow chart 600 may be implemented by a UE 115 or its components as described herein. For example, the operations of flow chart 600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 605, the UE may determine a PHR based on MPE limits for an FR2 connection with a cell group (e.g., an SCG). In some cases, the UE may determine a maximum transmit power for FR2 based on MPE limits (e.g., based on an MPE inner loop) and one or more conditions at the UE (e.g., other concurrent uplink transmissions that may occur at the UE, thermal limits at the UE). At 610, the UE may transmit the PHR to the base station.

At 615, the UE may receive an uplink grant for an uplink transmission on FR2. In this example, the UE may operate in a dual-connectivity mode in which a split bearer is configured on both FR1 and FR2, or where a bearer is associated with one particular frequency range. The uplink grant may be received at the UE in DCI from a serving base station, for example.

At 620, the UE may determine whether the uplink transmission power for the FR2 uplink transmission based on the uplink grant and one or more configured uplink transmission parameters is limited by MPE. In cases where the FR2 transmission is not power limited, the UE, at 625, may transmit the uplink data according to the uplink grant, and the UE may transmit scheduling requests (SRs) for FR1 and FR2 in accordance with configured logical cell IDs (LCIDs) associated with the FR1 and FR2 carrier groups, and report a same data volume in BSRs that are transmitted for both FR1 and FR2 (e.g., a BSR for a MCG and for a SCG that use different frequency ranges).

At 630, if the UE determines that the FR2 uplink transmission is power limited due to exposure limits, the UE may identify whether a split bearer is configured in which an MCG is on FR1. At 635, if a split bearer is configured, the UE may transmit an SR on the MCG and FR1 even though FR2 is the primary path and the SR would otherwise be transmitted on FR2. At 640, the UE may then transmit a BSR on the MCG with an LCID of the MCG radio link control (RLC) entity.

At 645, if a split bearer is not configured, the UE may not be able to transmit an SR or BSR on FR2, and the UE may transmit an SR on FR1 followed by a BSR that indicates a request to steer data to the FR1 MCG. Thus, in this example, the UE transmits an SR on FR1 even though an uplink grant is available on FR2. The subsequent BSR may include a special LCID field to indicate that the UE wants to split the SCG bearer and move data to an FR1 carrier group. The base station, upon receiving such a special LCID field, may recognize that the UE is MPE limited and adjust subsequent uplink grant scheduling accordingly to move data for the UE to FR1.

Figure 7:
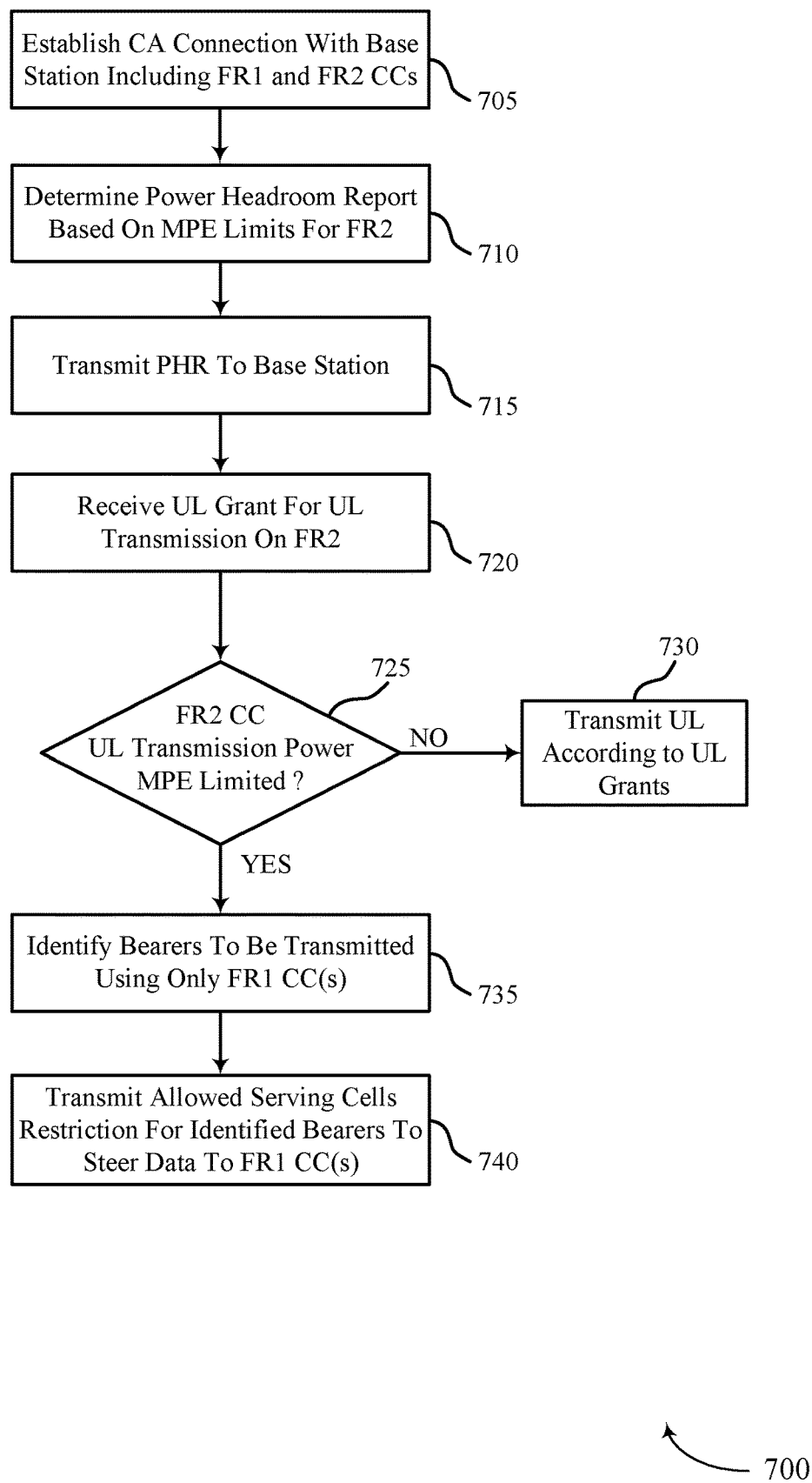

FIG. 7 illustrates an example of a flow chart 700 that supports uplink transmission techniques for exposure limited transmissions in accordance with aspects of the present disclosure. In some examples, flow chart 700 may implement aspects of wireless communications system 100 or 200. The operations of flow chart 700 may be implemented by a UE 115 or its components as described herein. For example, the operations of flow chart 700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

In this example, a UE and base station may operate in a carrier aggregation mode. At 705, the UE may establish a CA mode connection with a base station including one or more FR1 CCs and one or more FR2 CCs. At 710, the UE may determine a PHR based on MPE limits for the FR2 CC(s). In some cases, the UE may determine a maximum transmit power for FR2 based on MPE limits (e.g., based on an MPE inner loop) and one or more conditions at the UE (e.g., other concurrent uplink transmissions that may occur at the UE, thermal limits at the UE, etc.). At 715, the UE may transmit the PHR to the base station.

At 720, the UE may receive an uplink grant for an uplink transmission on an FR2 CC. The uplink grant may be received at the UE in DCI from a serving base station, for example. At 725, the UE may determine whether the uplink transmission power for the FR2 CC uplink transmission based on the uplink grant and one or more configured uplink transmission parameters is limited by MPE. In cases where the FR2 CC transmission is not power limited, the UE, at 730, may transmit the uplink data according to the uplink grant(s).

At 735, if the UE determines that the FR2 CC uplink transmission is power limited due to exposure limits, the UE may identify one or more bearers that are to be transmitted using only FR1 CCs. At 740, the UE may transmit to the base station an indication of an allowed serving cells restriction (e.g., an allowedServingCells restriction on an LCD of the identified bearer(s)), which may steer the data for the one or more bearers to CC(s) on FR1. In some cases, the UE may identify the bearers to restrict to the FR1 CCs based on latency targets (e.g., voice bearers may be restricted to FR1 CCs). Such serving cell restrictions, in some cases, may be transmitted by a UE only in MPE limited cases, and may be transmitted in cases where CA duplication is configured or not configured.

In some cases, the UE may implicitly indicate the serving cell restriction to the base station based on, for example, a BSR transmitted to the base station that indicates the identified bearer(s) are to be transmitted using FR1 CC(s). In some cases, the base station may provide an indication to the UE that the serving cell restriction is set.

Figure 8:
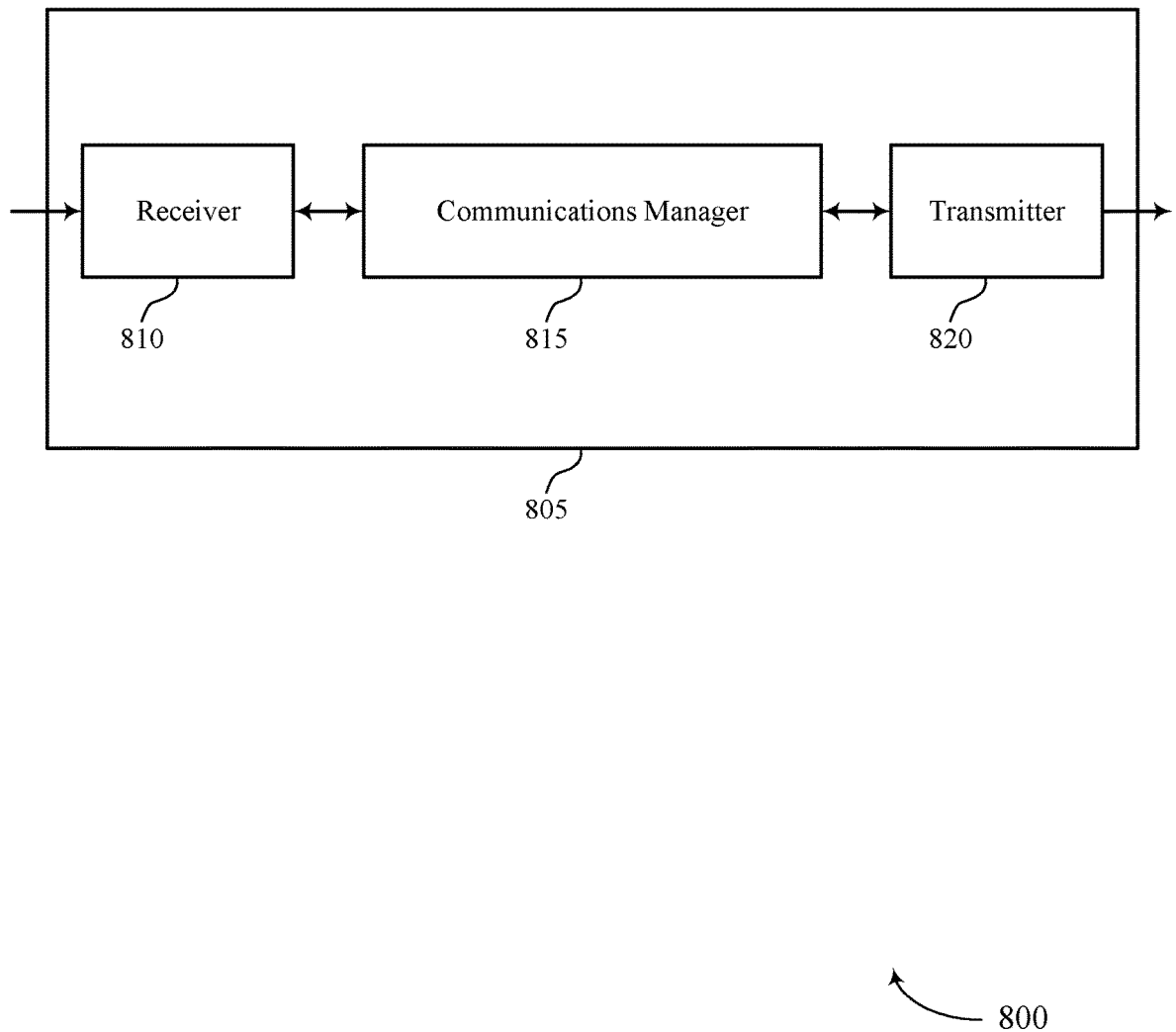
FIGS. 8 and 9 show block diagrams of devices that support uplink transmission techniques in accordance with aspects of the present disclosure.

FIG. 8 shows a block diagram 800 of a device 805 that supports uplink transmission techniques for exposure limited transmissions in accordance with aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to uplink transmission techniques for exposure limited transmissions, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive, from a base station, a first uplink grant indicating a set of uplink transmission resources for an uplink transmission in a high-band frequency range, and determine, based on the set of uplink transmission resources and one or more associated uplink transmission parameters, that the uplink transmission using the set of uplink transmission resources exceeds a maximum transmission power available to the UE that is based on an exposure threshold. The communications manager 815 may also determine that the uplink transmission includes control information multiplexed with data, and transmit, based on the determining that the uplink transmission includes control information, the uplink transmission with an increased uplink transmission power for a first subset of the set of uplink transmission resources associated with the control information relative to a reduced uplink transmission power for a second subset of the set of uplink transmission resources associated with the data.

The communications manager 815 may also establish a connection with a base station, the connection having a data radio bearer that is split over a first carrier group in a first frequency range and a second carrier group in a second frequency range, where a traffic volume at the UE exceeds a data threshold that indicates both the first carrier group and the second carrier group are to be used for uplink transmissions, and receive, from the base station, at least a first uplink grant indicating a set of uplink transmission resources using the second carrier group. The communications manager 815 may also determine, based on the set of uplink transmission resources and one or more associated uplink transmission parameters, that the uplink transmission using the set of uplink transmission resources exceeds a maximum transmission power available to the UE that is based on an exposure threshold, and transmit, based on the determining, via the first carrier group, a first indication of the traffic volume associated with the first carrier group and a second indication of the traffic volume associated with the second carrier group, where the second indication reports a lower traffic volume than the first indication.

The communications manager 815 may also establish a connection with a base station, the connection having a first carrier group in a first frequency range and a second carrier group in a second frequency range, where the second carrier group is configured for transmitting scheduling requests to the base station, and receive, from the base station, at least a first uplink grant indicating a set of uplink transmission resources for an uplink transmission using the second carrier group. The communications manager 815 may also determine, based on the set of uplink transmission resources and one or more associated uplink transmission parameters, that the uplink transmission using the set of uplink transmission resources exceeds a maximum transmission power available to the UE that is based on an exposure threshold, and transmit, based on the determining, a scheduling request to the base station using the first carrier group that indicates the first carrier group is to be used for uplink transmissions of the UE.

In some examples, the communications manager 815 may establish a connection with a base station, where a first traffic volume at the UE includes data to be transmitted to the base station and receive, from the base station, a first uplink grant indicating a set of uplink transmission resources. The communications manager 815 may determine, based on the set of uplink transmission resources and one or more associated uplink transmission parameters, that an uplink transmission of the data using the set of uplink transmission resources exceeds a maximum transmission power available to the UE that is based on an exposure threshold, calculate an adjusted traffic volume at the UE based on the set of uplink transmission resources and the data, and transmit an indication of the adjusted traffic volume, where a size of the adjusted traffic volume limits the uplink transmission of the data based at least in part on the exposure threshold.

The communications manager 815 may also establish a connection with a base station, the connection having a first component carrier in a first frequency range and a second component carrier in a second frequency range, receive, from the base station, at least a first uplink grant indicating a set of uplink transmission resources for an uplink transmission using the second component carrier, and determine, based on the set of uplink transmission resources and one or more associated uplink transmission parameters, that the uplink transmission using the set of uplink transmission resources exceeds a maximum transmission power available to the UE that is based on an exposure threshold. The communications manager 815 may also transmit, responsive to the determining that the exposure threshold is exceeded for the second component carrier, a first logical channel of a set of logical channels using only uplink transmission resources of the first component carrier. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), an FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
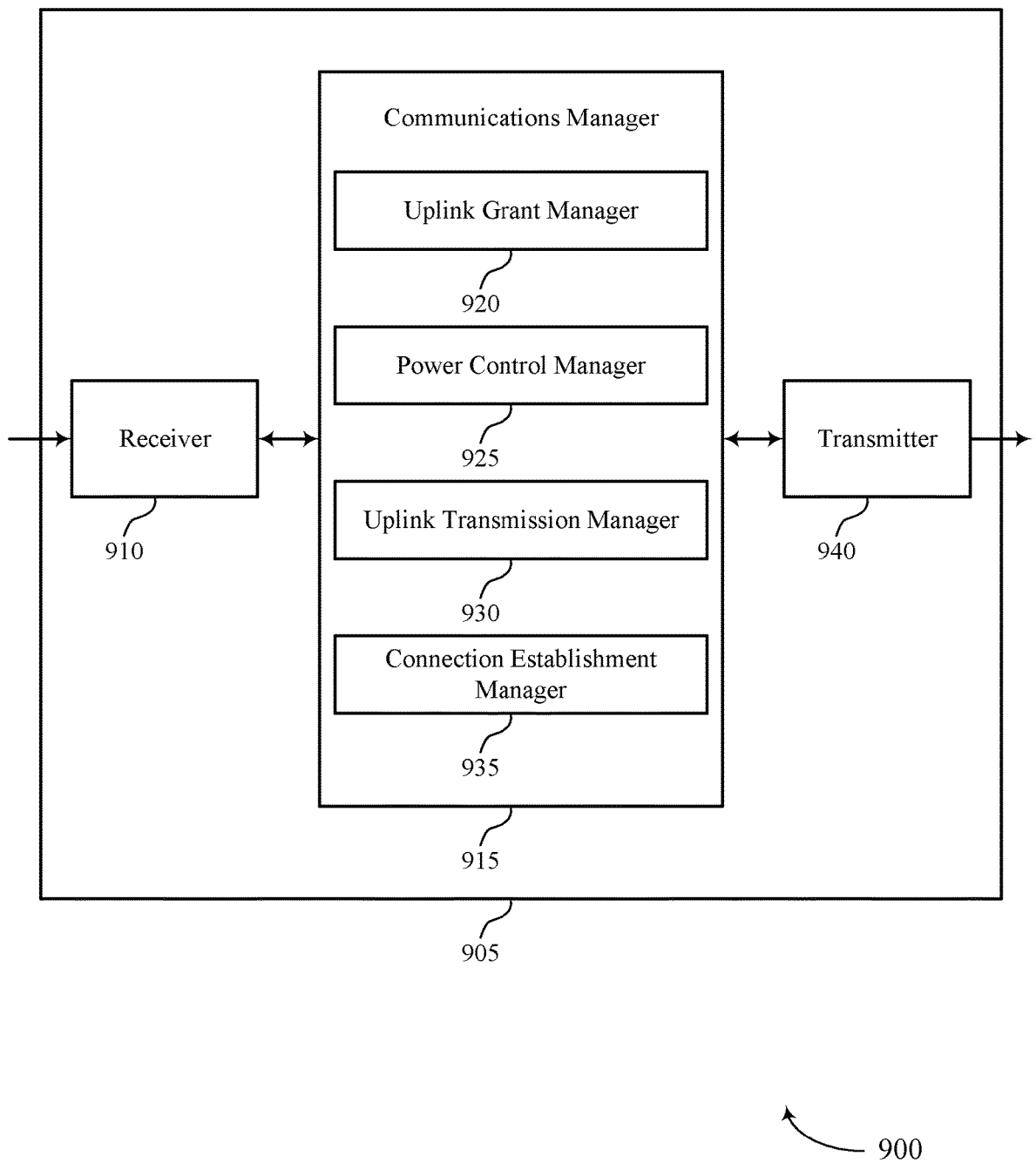

FIG. 9 shows a block diagram 900 of a device 905 that supports uplink transmission techniques for exposure limited transmissions in accordance with aspects of the present disclosure. The device 905 may be an example of aspects of a device 805, or a UE 115 as described herein. The device 905 may include a receiver 910, a communications manager 915, and a transmitter 940. The device 905 may also include a processor. Each of these components may be in communication with one another (e.g., via one or more buses).

The receiver 910 may receive information such as packets, user data, or control information associated with various information channels (e.g., control channels, data channels, and information related to uplink transmission techniques for exposure limited transmissions). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 915 as described herein. The communications manager 915 may include an uplink grant manager 920, a power control manager 925, an uplink transmission manager 930, and a connection establishment manager 935. The communications manager 915 may be an example of aspects of the communications manager 1110 described herein.

In some cases, the uplink grant manager 920 may receive, from a base station, a first uplink grant indicating a set of uplink transmission resources for an uplink transmission in a high-band frequency range. In some cases, the uplink grant manager 920 may receive a first uplink grant indicating a set of uplink transmission resources.

The power control manager 925 may determine, based on the set of uplink transmission resources and one or more associated uplink transmission parameters, that the uplink transmission using the set of uplink transmission resources exceeds a maximum transmission power available to the UE that is based on an exposure threshold. In some examples, the power control manager 925 may determine, based on the set of uplink transmission resources and one or more associated uplink transmission parameters, that an uplink transmission of the data using the set of uplink transmission resources exceeds a maximum transmission power available to the UE that is based on an exposure threshold.

The uplink transmission manager 930 may determine that the uplink transmission includes control information multiplexed with data and transmit, based on the determining that the uplink transmission includes control information, the uplink transmission with an increased uplink transmission power for a first subset of the set of uplink transmission resources associated with the control information relative to a reduced uplink transmission power for a second subset of the set of uplink transmission resources associated with the data.

The connection establishment manager 935 may establish a connection with a base station, the connection having a data radio bearer that is split over a first carrier group in a first frequency range and a second carrier group in a second frequency range, where a traffic volume at the UE exceeds a data threshold that indicates both the first carrier group and the second carrier group are to be used for uplink transmissions. In some examples, the connection establishment manager 935 may establish a connection with a base station, where a first traffic volume at the UE includes data to be transmitted to the base station.

In some cases, the uplink grant manager 920 may receive, from the base station, at least a first uplink grant indicating a set of uplink transmission resources using the second carrier group. The power control manager 925 may determine, based on the set of uplink transmission resources and one or more associated uplink transmission parameters, that the uplink transmission using the set of uplink transmission resources exceeds a maximum transmission power available to the UE that is based on an exposure threshold. In some examples, the power control manager 925 may calculate an adjusted traffic volume at the UE based on the set of uplink transmission resources and the data. The uplink transmission manager 930 may transmit, based on the determining, via the first carrier group, a first indication of the traffic volume associated with the first carrier group and a second indication of the traffic volume associated with the second carrier group, where the second indication reports a lower traffic volume than the first indication. In some examples, the uplink transmission manager 930 may transmit an indication of the adjusted traffic volume, where a size of the adjusted traffic volume limits the uplink transmission of the data based on the exposure threshold.

The connection establishment manager 935 may establish a connection with a base station, the connection having a first carrier group in a first frequency range and a second carrier group in a second frequency range, where the second carrier group is configured for transmitting scheduling requests to the base station.

In some cases, the uplink grant manager 920 may receive, from the base station, at least a first uplink grant indicating a set of uplink transmission resources for an uplink transmission using the second carrier group. The power control manager 925 may determine, based on the set of uplink transmission resources and one or more associated uplink transmission parameters, that the uplink transmission using the set of uplink transmission resources exceeds a maximum transmission power available to the UE that is based on an exposure threshold. The uplink transmission manager 930 may transmit, based on the determining, a scheduling request to the base station using the first carrier group that indicates the first carrier group is to be used for uplink transmissions of the UE. The connection establishment manager 935 may establish a connection with a base station, the connection having a first component carrier in a first frequency range and a second component carrier in a second frequency range.

In some cases, the uplink grant manager 920 may receive, from the base station, at least a first uplink grant indicating a set of uplink transmission resources for an uplink transmission using the second component carrier. The power control manager 925 may determine, based on the set of uplink transmission resources and one or more associated uplink transmission parameters, that the uplink transmission using the set of uplink transmission resources exceeds a maximum transmission power available to the UE that is based on an exposure threshold. The uplink transmission manager 930 may transmit, responsive to the determining that the exposure threshold is exceeded for the second component carrier, a first logical channel of a set of logical channels using only uplink transmission resources of the first component carrier.

The transmitter 940 may transmit signals generated by other components of the device 905. In some examples, the transmitter 940 may be collocated with a receiver 910 in a transceiver module. For example, the transmitter 940 may be an example of aspects of the transceiver 1120 described with reference to FIG. 11. The transmitter 940 may utilize a single antenna or a set of antennas.

Figure 10:
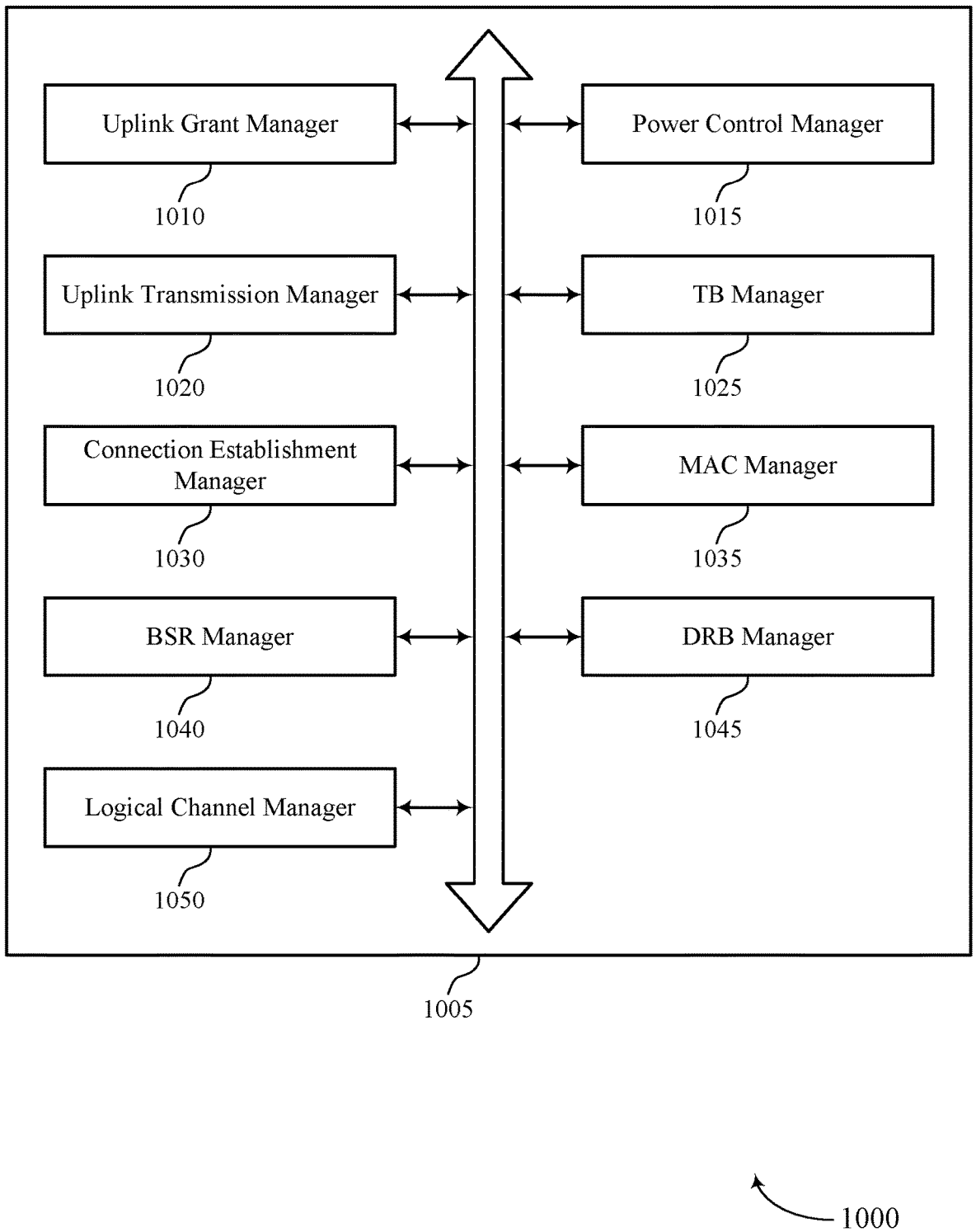
FIG. 10 shows a block diagram of a communications manager that supports uplink transmission techniques in accordance with aspects of the present disclosure.

FIG. 10 shows a block diagram 1000 of a communications manager 1005 that supports uplink transmission techniques for exposure limited transmissions in accordance with aspects of the present disclosure. The communications manager 1005 may be an example of aspects of a communications manager 815, a communications manager 915, or a communications manager 1110 described herein. The communications manager 1005 may include an uplink grant manager 1010, a power control manager 1015, an uplink transmission manager 1020, a TB manager 1025, a connection establishment manager 1030, a MAC manager 1035, a BSR manager 1040, a DRB manager 1045, and a logical channel manager 1050. Each of these modules may communicate, directly or indirectly, with one another (e.g., via one or more buses).

The uplink grant manager 1010 may receive, from a base station, a first uplink grant indicating a set of uplink transmission resources for an uplink transmission in a high-band frequency range (e.g., for an SCG or CC using FR2). In some cases, the uplink grant manager 1010 may receive a first uplink grant indicating a set of uplink transmission resources.

The power control manager 1015 may determine, based on the set of uplink transmission resources and one or more associated uplink transmission parameters, that the uplink transmission using the set of uplink transmission resources exceeds a maximum transmission power available to the UE that is based on an exposure threshold. In some examples, the power control manager 1015 may determine that a second uplink transmission at the second uplink transmission power using the second set of uplink transmission resources is within the exposure threshold. In some examples, the power control manager 1015 may determine that the second uplink transmission using the second set of uplink transmission resources exceeds a second maximum transmission power available to the UE that is based on the exposure threshold.

In some examples, the power control manager 1015 may determine, based on the set of uplink transmission resources and one or more associated uplink transmission parameters, that an uplink transmission of the data using the set of uplink transmission resources exceeds a maximum transmission power available to the UE that is based on an exposure threshold. In some examples, the power control manager 1015 may calculate an adjusted traffic volume at the UE based on the set of uplink transmission resources and the data. In some cases, the power control manager 1015 may identify a time interval based on a trigger associated with the uplink transmission of the data using the set of uplink transmission resources exceeding a maximum transmission power available to the UE, where the adjusted traffic volume is calculated based on a duration of the time interval, the data to be transmitted to the base station, and the set of uplink transmission resources.

In some examples, calculating the adjusted traffic volume includes forming a first TB with a portion of the data to be transmitted, subtracting, from the first traffic volume, a size of the portion of the data in the first TB, and identifying, within the time interval, an end position for forming one or more additional TBs with the data based on the subtracting, where the first TB includes the indication of the adjusted traffic volume. In some examples, calculating the adjust traffic volume includes calculating a first adjusted traffic volume associated with the first carrier group and a second adjusted traffic volume associated with the second carrier group. In some examples, the power control manager 1015 may adjust the data threshold based on the exposure threshold and determine that the first traffic volume at the UE exceeds the adjusted data threshold.

In some examples, the power control manager 1015 may generate a virtual power headroom report for the first subset of the set of uplink transmission resources based on skipping the first subset of the set of uplink transmission resources. In some examples, the power control manager 1015 may delay the power headroom report until a second time interval that is after the time interval based on the number of TBs being greater than the skipping threshold.

The uplink transmission manager 1020 may determine that the uplink transmission includes control information multiplexed with data. In some examples, the uplink transmission manager 1020 may transmit, based on the determining that the uplink transmission includes control information, the uplink transmission with an increased uplink transmission power for a first subset of the set of uplink transmission resources associated with the control information relative to a reduced uplink transmission power for a second subset of the set of uplink transmission resources associated with the data. In some cases, the transmitting at the increased uplink transmission power in the first subset of uplink transmission resources and at the reduced uplink transmission power in the second subset of uplink transmission resources provides an aggregate transmission power that is within the exposure threshold.

In some examples, the uplink transmission manager 1020 may transmit, based on the determining, via the first carrier group, a first indication of the traffic volume associated with the first carrier group and a second indication of the traffic volume associated with the second carrier group, where the second indication reports a lower traffic volume than the first indication. In some examples, the uplink transmission manager 1020 may transmit, based on the determining, a scheduling request to the base station using the first carrier group that indicates the first carrier group is to be used for uplink transmissions of the UE. In some examples, the uplink transmission manager 1020 may transmit an indication of the adjusted traffic volume, where a size of the adjusted traffic volume limits the uplink transmission of the data based on the exposure threshold. In some examples, transmitting the indication of the adjusted traffic volume includes transmitting an indication of the first adjusted traffic volume and the second adjusted traffic volume, where one or both of the first adjusted traffic volume or the second adjusted traffic volume limits the uplink transmission of the data one the first carrier group or the second carrier group based on the exposure threshold. In some cases, the indication of the first adjusted traffic volume and the second adjusted traffic volume steers data traffic to the first carrier group.

In some examples, the uplink transmission manager 1020 may transmit, responsive to the determining that the exposure threshold is exceeded for a second component carrier, a first logical channel of a set of logical channels using only uplink transmission resources of the first component carrier. In some cases, the first uplink grant indicates the first logical channel is to be transmitted at least partially using the second component carrier when the uplink transmission using the set of uplink transmission resources is within the maximum transmission power.

In some examples, the uplink transmission manager 1020 may determine that the second uplink transmission includes second control information multiplexed with data. In some examples, the uplink transmission manager 1020 may transmit the second uplink transmission at an increased second uplink transmission power for a first subset of the second set of uplink transmission resources associated with the second control information relative to a second uplink transmission power for a second subset of the second set of uplink transmission resources associated with the data.

In some examples, the uplink transmission manager 1020 may transmit control information to the base station that indicates different traffic volumes for the first carrier group and the second carrier group are due to the exposure threshold associated with the second carrier group. In some cases, the first indication of the traffic volume associated with the first carrier group and the second indication of the traffic volume associated with the second carrier group steers data traffic to the first carrier group. In some examples, the uplink transmission manager 1020 may steer data traffic to the first carrier group or to the second carrier group based on the first traffic volume at the UE exceeding the adjusted data threshold.

In some examples, neither of the first component carrier nor the second component carrier are duplicated component carriers. In some cases, the first frequency range is a sub-6 GHz frequency range and the second frequency range is a millimeter wave frequency range.

In some examples, the uplink transmission manager 1020 may determine, based on the set of uplink transmission resources, that the uplink transmission using the set of uplink transmission resources exceeds a threshold. In some examples, the uplink transmission manager 1020 may identify, based on a skipping rule, a first subset of the set of uplink transmission resources, where the skipping rule is based on the uplink transmission exceeding the threshold and a presence a power headroom report within a time interval of the uplink transmission. In some examples, the uplink transmission manager 1020 may transmit the uplink transmission in at least a second subset of the set of uplink transmission resources based on the skipping rule.

In some examples, the uplink transmission manager 1020 may determine that a number of the one or more uplink grants is less than or equal to a skipping threshold based on the skipping rule. In some examples, the uplink transmission manager 1020 may determine to skip the first subset of the set of uplink transmission resources based on the number of the one or more uplink grants being less than or equal to the skipping threshold. In some examples, the uplink transmission manager 1020 may fill one or more TBs associated with the second subset of the set of uplink transmission resources with data and the power headroom report. In some cases, the uplink transmission manager 1020 may refrain from filling one or more TBs associated with the first subset of the set of uplink transmission resources based on skipping the first subset of the set of uplink transmission resources.

In some examples, the uplink transmission manager 1020 may determine that a number of the one or more uplink grants is greater than a skipping threshold based on the skipping rule. In some examples, the uplink transmission manager 1020 may fill, based on the number of the one or more uplink grants being greater than the skipping threshold, TBs associated with the first subset of the set of uplink transmission resources and the second subset of the set of uplink transmission resources with data, or padding, or the power headroom report, or any combination thereof. In some examples, the uplink transmission manager 1020 may transmit the first subset of the set of uplink transmission resources and the second subset of the set of uplink transmission resources.

In some examples, the uplink transmission manager 1020 may determine to skip the first subset of the set of uplink transmission resources based on the number of the one or more uplink grants being greater than the skipping threshold.

The connection establishment manager 1030 may establish a connection with a base station, the connection having a data radio bearer that is split over a first carrier group in a first frequency range and a second carrier group in a second frequency range, where a traffic volume at the UE exceeds a data threshold that indicates both the first carrier group and the second carrier group are to be used for uplink transmissions. In some examples, the second carrier group is configured for transmitting scheduling requests to the base station. In some cases, the connection has a radio bearer that is split over a first carrier group in a first frequency range and a second carrier group in a second frequency range, where the first traffic volume at the UE exceeds a data threshold that indicates both the first carrier group and the second carrier group are to be used for uplink transmissions.

In some examples, the connection establishment manager 1030 may establish a connection with a base station, the connection having a first component carrier in a first frequency range and a second component carrier in a second frequency range. In some examples, the connection establishment manager 1030 may establish a connection with a base station, where a first traffic volume at the UE includes data to be transmitted to the base station.

The TB manager 1025 may refrain from forming a TB with the data. In some examples, the TB manager 1025 may transmit padding rather than data in the second subset of uplink transmission resources. In some cases, the TB manager 1025 may determine whether a TB with the data is a self-decodable TB. In some aspects, the TB manager 1025 may form the data into the TB based on determining that the TB with the data is self-decodable and transmit the TB in the second uplink transmission. In some examples, the TB manager 1025 may drop the second uplink transmission based on determining that the TB with the data is not self-decodable. In some examples, the TB manager 1025 may refrain from forming the one or more additional TBs with a remaining portion of the data based on identifying the end position, where the one or more additional TB may be skipped until an end of the time interval. In other examples, the one or more additional TBs may be padded until the end of the time interval. In some examples, the TB manager 1025 may pad the first TB based on the size of the portion of the data. In some cases, the size of the adjusted traffic volume is zero bytes.

In some examples, the TB manager 1025 may determine that a number of TBs associated with the one or more uplink grants is less than or equal to a skipping threshold based on the skipping rule. In some examples, the TB manager 1025 may determine to skip the first subset of the set of uplink transmission resources based on the number of the TBs being less than or equal to the skipping threshold.

In some examples, the TB manager 1025 may determine that a number of TBs associated with the one or more uplink grants is greater than a skipping threshold based on the skipping rule. In some cases, the TB manager 1025 may determine to skip the first subset of the set of uplink transmission resources based on the number of the TBs being greater than the skipping threshold.

The MAC manager 1035 may, in some cases, provide control information using a MAC control element. In some examples, the MAC manager 1035 may determine a MAC buffer size for each of the first carrier group and the second carrier group, where the first adjusted traffic volume and the second adjusted traffic volume are based on the MAC buffer size. In some examples, the MAC manager 1035 may subtract a size of data placed in a TB from a scaled buffer size (sometimes referred to as fake buffer size, or an indication of an adjusted traffic volume) as each TB is filled with payload. In some cases, when the internal buffer size reaches 0 bytes, a padding BSR shall be triggered and the 0 byte BSR shall be placed in the TB. If space remains in the TB, padding shall be used to fill the remaining portion of the TB The BSR manager 1040 may, in some cases, format and transmit one or more BSRs. In some cases, a data radio bearer carrying data for the uplink transmissions of the second carrier group is associated with the second carrier group only, and where the UE transmits a buffer status report subsequent to the scheduling request that requests a change for the data radio bearer to be split between the first carrier group and the second carrier group. In some cases, the buffer status report includes a special logical channel identification field to indicate the request to change the data radio bearer.

The DRB manager 1045 may establish one or more DRBs in a dual-connectivity mode. In some cases, a data radio bearer carrying data for the uplink transmissions of the second carrier group is split over the first carrier group and the second carrier group, and a volume of uplink data at the UE is less than a data threshold that indicates that the second carrier group is to be used for transmitting the uplink data.

The logical channel manager 1050 may transmit control signaling to the base station that indicates the first logical channel is to be transmitted using only uplink transmission resources of the first component carrier. In some examples, the logical channel manager 1050 may transmit an allowed serving cell restriction for a logical channel identification of the first logical channel that indicates the first logical channel is to be transmitted using only a serving cell associated with the first component carrier. In some examples, the logical channel manager 1050 may receive, from the base station based on the transmitting, an allowed serving cell restriction for a logical channel identification of the first logical channel that indicates the first logical channel is to be transmitted using only a serving cell associated with the first component carrier. In some cases, the first logical channel carries voice data. In some cases, the serving cell restriction is transmitted only when the exposure threshold for the second component carrier is exceeded.

Figure 11:
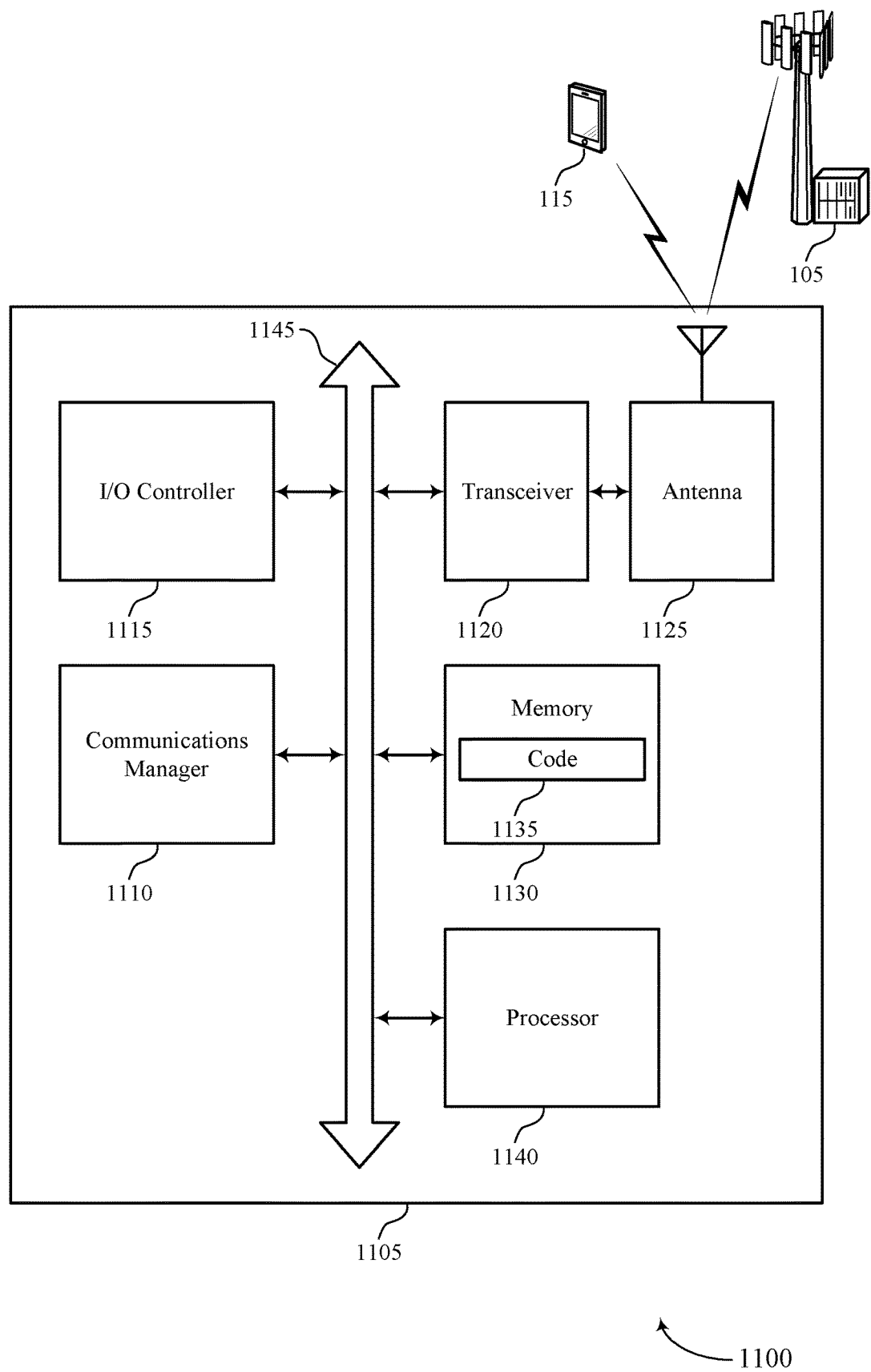
FIG. 11 shows a diagram of a system including a device that supports uplink transmission techniques in accordance with aspects of the present disclosure.

FIG. 11 shows a diagram of a system 1100 including a device 1105 that supports uplink transmission techniques for exposure limited transmissions in accordance with aspects of the present disclosure. The device 1105 may be an example of or include the components of device 805, device 805, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive, from a base station, a first uplink grant indicating a set of uplink transmission resources for an uplink transmission in a high-band frequency range, and determine, based on the set of uplink transmission resources and one or more associated uplink transmission parameters, that the uplink transmission using the set of uplink transmission resources exceeds a maximum transmission power available to the UE that is based on an exposure threshold. The communications manager 1110 may also determine that the uplink transmission includes control information multiplexed with data, and transmit, based on the determining that the uplink transmission includes control information, the uplink transmission with an increased uplink transmission power for a first subset of the set of uplink transmission resources associated with the control information relative to a reduced uplink transmission power for a second subset of the set of uplink transmission resources associated with the data.

The communications manager 1110 may also establish a connection with a base station, the connection having a data radio bearer that is split over a first carrier group in a first frequency range and a second carrier group in a second frequency range, where a traffic volume at the UE exceeds a data threshold that indicates both the first carrier group and the second carrier group are to be used for uplink transmissions, and receive, from the base station, at least a first uplink grant indicating a set of uplink transmission resources using the second carrier group. The communications manager 1110 may also determine, based on the set of uplink transmission resources and one or more associated uplink transmission parameters, that the uplink transmission using the set of uplink transmission resources exceeds a maximum transmission power available to the UE that is based on an exposure threshold, and transmit, based on the determining, via the first carrier group, a first indication of the traffic volume associated with the first carrier group and a second indication of the traffic volume associated with the second carrier group, where the second indication reports a lower traffic volume than the first indication.

The communications manager 1110 may also establish a connection with a base station, the connection having a first carrier group in a first frequency range and a second carrier group in a second frequency range, where the second carrier group is configured for transmitting scheduling requests to the base station, and receive, from the base station, at least a first uplink grant indicating a set of uplink transmission resources for an uplink transmission using the second carrier group. The communications manager 1110 may also determine, based on the set of uplink transmission resources and one or more associated uplink transmission parameters, that the uplink transmission using the set of uplink transmission resources exceeds a maximum transmission power available to the UE that is based on an exposure threshold, and transmit, based on the determining, a scheduling request to the base station using the first carrier group that indicates the first carrier group is to be used for uplink transmissions of the UE.

The communications manager 1110 may also establish a connection with a base station, the connection having a first component carrier in a first frequency range and a second component carrier in a second frequency range, and receive, from the base station, at least a first uplink grant indicating a set of uplink transmission resources for an uplink transmission using the second component carrier. The communications manager 1110 may also determine, based on the set of uplink transmission resources and one or more associated uplink transmission parameters, that the uplink transmission using the set of uplink transmission resources exceeds a maximum transmission power available to the UE that is based on an exposure threshold, and transmit, responsive to the determining that the exposure threshold is exceeded for the second component carrier, a first logical channel of a set of logical channels using only uplink transmission resources of the first component carrier. In some cases, the first uplink grant indicates the first logical channel is to be transmitted at least partially using the second component carrier when the uplink transmission using the set of uplink transmission resources is within the maximum transmission power.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described herein. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting uplink transmission techniques for exposure limited transmissions).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
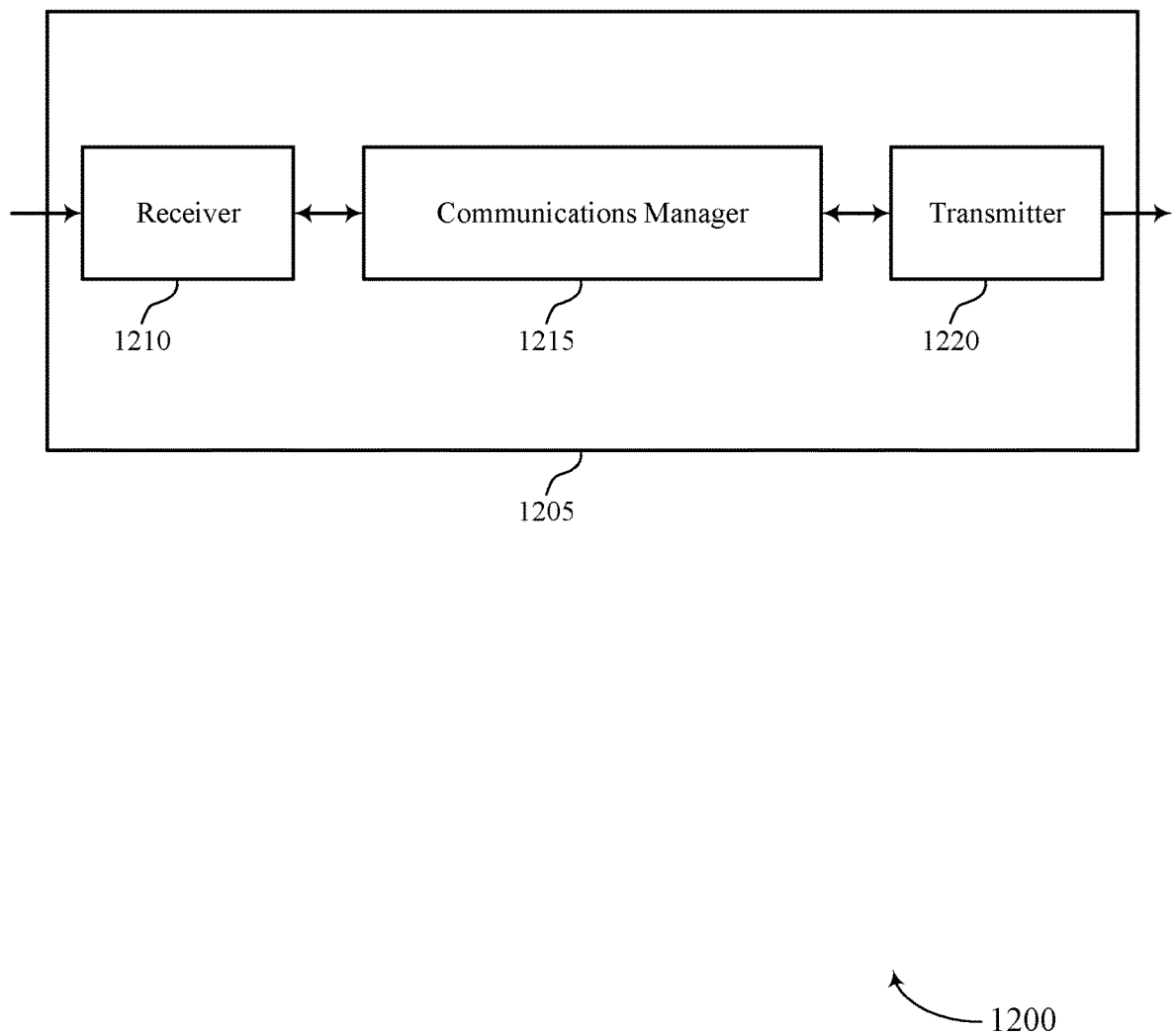
FIGS. 12 and 13 show block diagrams of devices that support uplink transmission techniques in accordance with aspects of the present disclosure.

FIG. 12 shows a block diagram 1200 of a device 1205 that supports uplink transmission techniques for exposure limited transmissions in accordance with aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to uplink transmission techniques for exposure limited transmissions). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may establish a connection with a UE, the connection having a data radio bearer that is split over a first carrier group in a first frequency range and a second carrier group in a second frequency range, and configure a data threshold at the UE that indicates that both the first carrier group and the second carrier group are to be used for uplink transmissions when a buffered data volume exceeds the data threshold. The communications manager 1215 may also transmit, to the UE, at least a first uplink grant indicating a set of uplink transmission resources using the second carrier group, steer uplink data to the first carrier group responsive to the receiving, and receive, from the UE via the first carrier group, a first indication of the traffic volume associated with the first carrier group and a second indication of the traffic volume associated with the second carrier group, where the second indication reports a lower traffic volume than the first indication. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
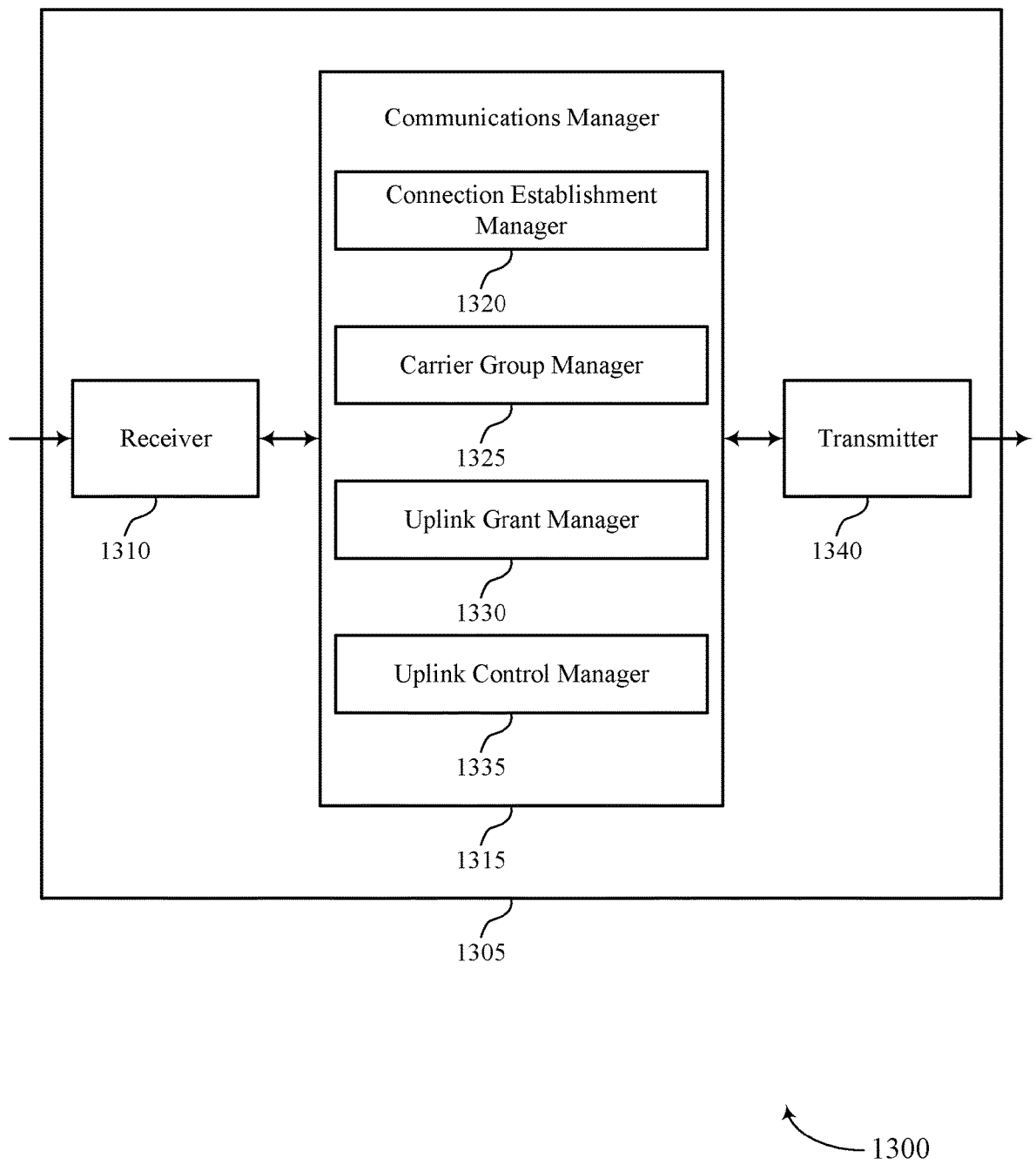

FIG. 13 shows a block diagram 1300 of a device 1305 that supports uplink transmission techniques for exposure limited transmissions in accordance with aspects of the present disclosure. The device 1305 may be an example of aspects of a device 1105, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to uplink transmission techniques for exposure limited transmissions). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a connection establishment manager 1320, a carrier group manager 1325, an uplink grant manager 1330, and an uplink control manager 1335. The communications manager 1315 may be an example of aspects of the communications manager 1510 described herein.

The connection establishment manager 1320 may establish a connection with a UE, the connection having a data radio bearer that is split over a first carrier group in a first frequency range and a second carrier group in a second frequency range.

The carrier group manager 1325 may configure a data threshold at the UE that indicates that both the first carrier group and the second carrier group are to be used for uplink transmissions when a buffered data volume exceeds the data threshold.

The uplink grant manager 1330 may transmit, to the UE, at least a first uplink grant indicating a set of uplink transmission resources using the second carrier group and steer uplink data to the first carrier group responsive to the receiving.

The uplink control manager 1335 may receive, from the UE via the first carrier group, a first indication of the traffic volume associated with the first carrier group and a second indication of the traffic volume associated with the second carrier group, where the second indication reports a lower traffic volume than the first indication.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
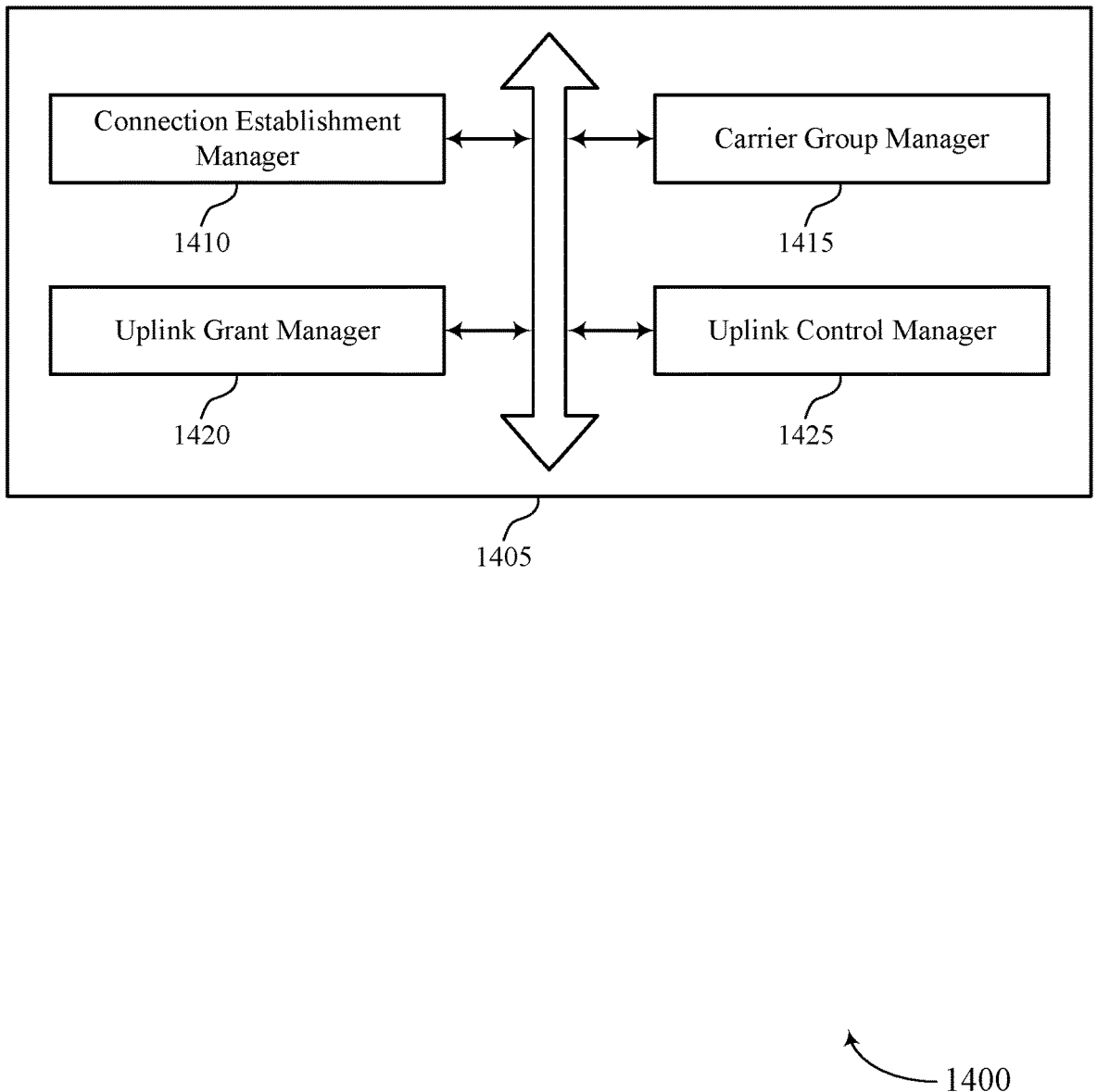
FIG. 14 shows a block diagram of a communications manager that supports uplink transmission techniques in accordance with aspects of the present disclosure.

FIG. 14 shows a block diagram 1400 of a communications manager 1405 that supports uplink transmission techniques for exposure limited transmissions in accordance with aspects of the present disclosure. The communications manager 1405 may be an example of aspects of a communications manager 1215, a communications manager 1315, or a communications manager 1510 described herein. The communications manager 1405 may include a connection establishment manager 1410, a carrier group manager 1415, an uplink grant manager 1420, and an uplink control manager 1425. Each of these modules may communicate, directly or indirectly, with one another (e.g., via one or more buses).

The connection establishment manager 1410 may establish a connection with a UE, the connection having a data radio bearer that is split over a first carrier group in a first frequency range and a second carrier group in a second frequency range. In some cases, the first frequency range is a sub-6 GHz frequency range and the second frequency range is a millimeter wave frequency range.

The carrier group manager 1415 may configure a data threshold at the UE that indicates that both the first carrier group and the second carrier group are to be used for uplink transmissions when a buffered data volume exceeds the data threshold.

The uplink grant manager 1420 may transmit, to the UE, at least a first uplink grant indicating a set of uplink transmission resources using the second carrier group. In some examples, the uplink grant manager 1420 may steer uplink data to the first carrier group responsive to the receiving.

The uplink control manager 1425 may receive, from the UE via the first carrier group, a first indication of the traffic volume associated with the first carrier group and a second indication of the traffic volume associated with the second carrier group, where the second indication reports a lower traffic volume than the first indication. In some examples, the uplink control manager 1425 may receive, from the UE, control information that indicates different traffic volumes for the first carrier group and the second carrier group are due to the exposure threshold associated with the second carrier group. In some cases, the control information is received via a MAC control element.

Figure 15:
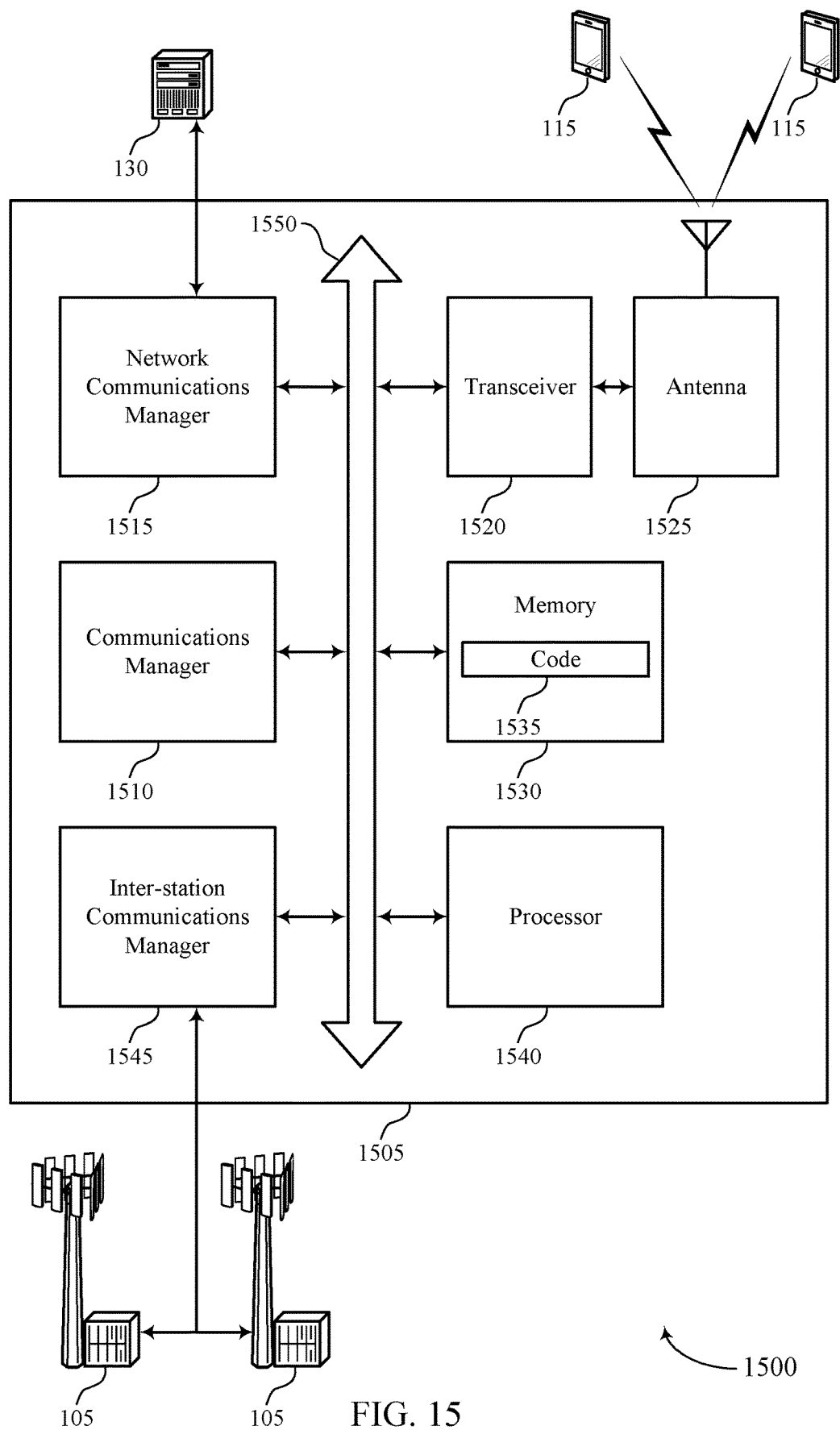
FIG. 15 shows a diagram of a system including a device that supports uplink transmission techniques in accordance with aspects of the present disclosure.

FIG. 15 shows a diagram of a system 1500 including a device 1505 that supports uplink transmission techniques for exposure limited transmissions in accordance with aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may establish a connection with a UE, the connection having a data radio bearer that is split over a first carrier group in a first frequency range and a second carrier group in a second frequency range, and configure a data threshold at the UE that indicates that both the first carrier group and the second carrier group are to be used for uplink transmissions when a buffered data volume exceeds the data threshold. The communications manager 1510 may also transmit, to the UE, at least a first uplink grant indicating a set of uplink transmission resources using the second carrier group, steer uplink data to the first carrier group responsive to the receiving, and receive, from the UE via the first carrier group, a first indication of the traffic volume associated with the first carrier group and a second indication of the traffic volume associated with the second carrier group, where the second indication reports a lower traffic volume than the first indication.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described herein. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting uplink transmission techniques for exposure limited transmissions).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
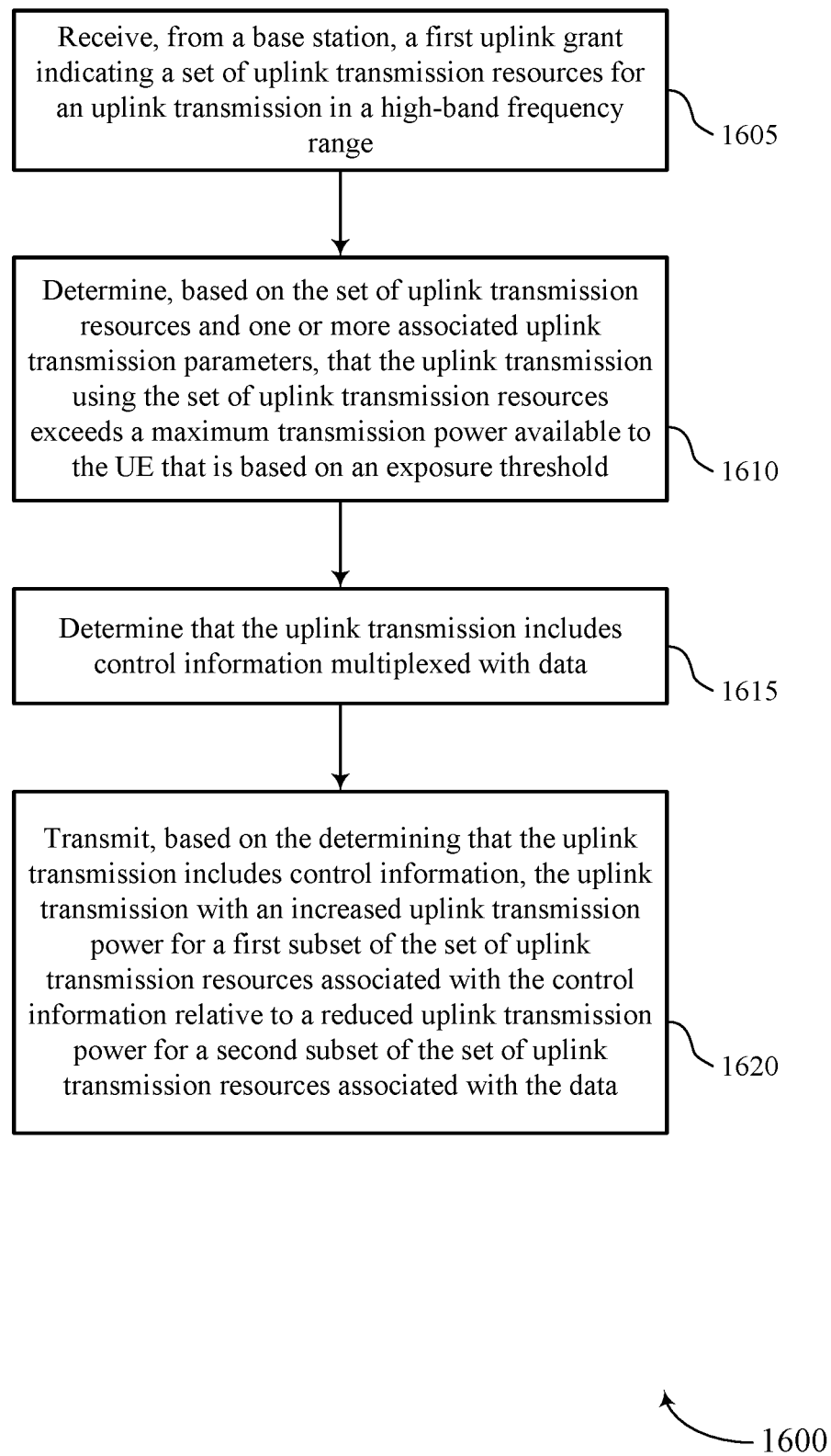
FIGS. 16 through 21 show flowcharts illustrating methods that support uplink transmission techniques in accordance with aspects of the present disclosure.

FIG. 16 shows a flowchart illustrating a method 1600 that supports uplink transmission techniques for exposure limited transmissions in accordance with aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1605, the UE may receive, from a base station, a first uplink grant indicating a set of uplink transmission resources for an uplink transmission in a high-band frequency range. The operations of 1605 may be performed according to the methods described herein. In some examples, aspects of the operations of 1605 may be performed by an uplink grant manager as described with reference to FIGS. 8 through 11.

At 1610, the UE may determine, based on the set of uplink transmission resources and one or more associated uplink transmission parameters, that the uplink transmission using the set of uplink transmission resources exceeds a maximum transmission power available to the UE that is based on an exposure threshold. The operations of 1610 may be performed according to the methods described herein. In some examples, aspects of the operations of 1610 may be performed by a power control manager as described with reference to FIGS. 8 through 11.

At 1615, the UE may determine that the uplink transmission includes control information multiplexed with data. The operations of 1615 may be performed according to the methods described herein. In some examples, aspects of the operations of 1615 may be performed by an uplink transmission manager as described with reference to FIGS. 8 through 11.

At 1620, the UE may transmit, based on the determining that the uplink transmission includes control information, the uplink transmission with an increased uplink transmission power for a first subset of the set of uplink transmission resources associated with the control information relative to a reduced uplink transmission power for a second subset of the set of uplink transmission resources associated with the data. The operations of 1620 may be performed according to the methods described herein. In some examples, aspects of the operations of 1620 may be performed by an uplink transmission manager as described with reference to FIGS. 8 through 11.

Figure 17:
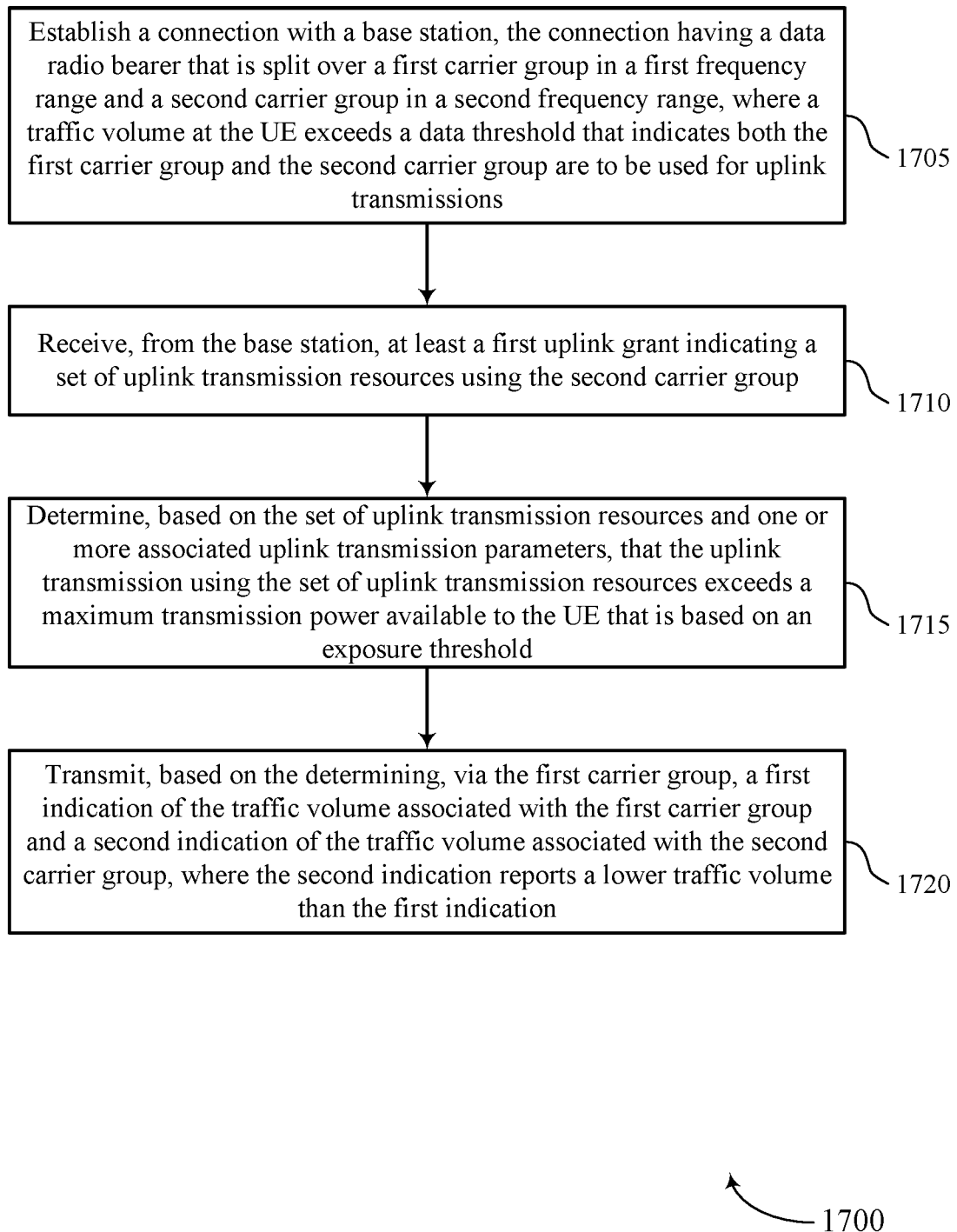

FIG. 17 shows a flowchart illustrating a method 1700 that supports uplink transmission techniques for exposure limited transmissions in accordance with aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1705, the UE may establish a connection with a base station, the connection having a data radio bearer that is split over a first carrier group in a first frequency range and a second carrier group in a second frequency range, where a traffic volume at the UE exceeds a data threshold that indicates both the first carrier group and the second carrier group are to be used for uplink transmissions. The operations of 1705 may be performed according to the methods described herein. In some examples, aspects of the operations of 1705 may be performed by a connection establishment manager as described with reference to FIGS. 8 through 11.

At 1710, the UE may receive, from the base station, at least a first uplink grant indicating a set of uplink transmission resources using the second carrier group. The operations of 1710 may be performed according to the methods described herein. In some examples, aspects of the operations of 1710 may be performed by an uplink grant manager as described with reference to FIGS. 8 through 11.

At 1715, the UE may determine, based on the set of uplink transmission resources and one or more associated uplink transmission parameters, that the uplink transmission using the set of uplink transmission resources exceeds a maximum transmission power available to the UE that is based on an exposure threshold. The operations of 1715 may be performed according to the methods described herein. In some examples, aspects of the operations of 1715 may be performed by a power control manager as described with reference to FIGS. 8 through 11.

At 1720, the UE may transmit, based on the determining, via the first carrier group, a first indication of the traffic volume associated with the first carrier group and a second indication of the traffic volume associated with the second carrier group, where the second indication reports a lower traffic volume than the first indication. The operations of 1720 may be performed according to the methods described herein. In some examples, aspects of the operations of 1720 may be performed by an uplink transmission manager as described with reference to FIGS. 8 through 11.

Figure 18:
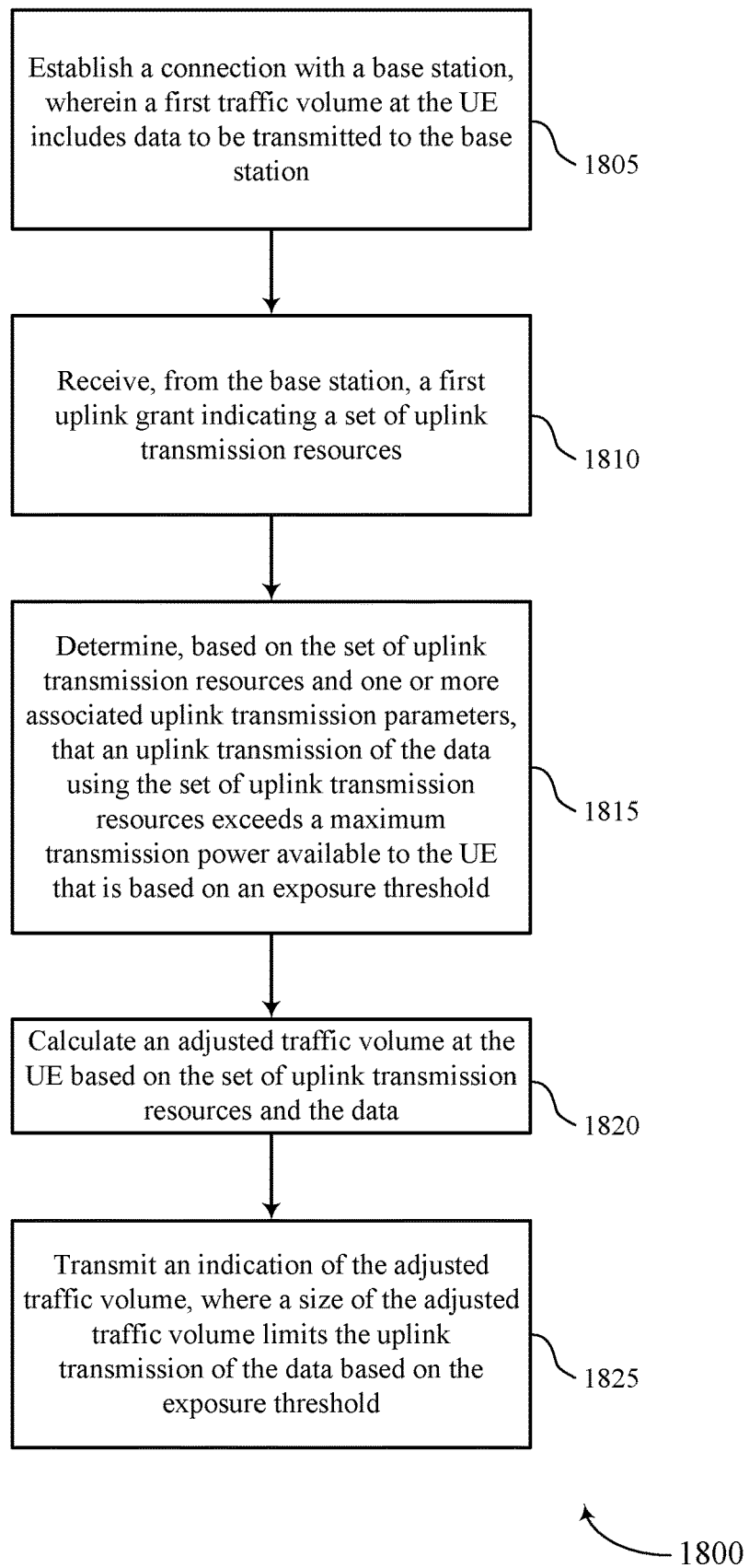

FIG. 18 shows a flowchart illustrating a method 1800 that supports uplink transmission techniques for exposure limited transmissions in accordance with aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1805, the UE may establish a connection with a base station, where a first traffic volume at the UE including data to be transmitted to the base station. The operations of 1805 may be performed according to the methods described herein. In some examples, aspects of the operations of 1805 may be performed by a connection establishment manager as described with reference to FIGS. 8 through 11.

At 1810, the UE may receive, from the base station, a first uplink grant indicating a set of uplink transmission resources. The operations of 1810 may be performed according to the methods described herein. In some examples, aspects of the operations of 1810 may be performed by an uplink grant manager as described with reference to FIGS. 8 through 11.

At 1815, the UE may determine, based on the set of uplink transmission resources and one or more associated uplink transmission parameters, that an uplink transmission of the data using the set of uplink transmission resources exceeds a maximum transmission power available to the UE that is based on an exposure threshold. The operations of 1815 may be performed according to the methods described herein. In some examples, aspects of the operations of 1815 may be performed by a power control manager as described with reference to FIGS. 8 through 11.

At 1820, the UE may calculate an adjusted traffic volume at the UE based on the set of uplink transmission resources and the data. The operations of 1820 may be performed according to the methods described herein. In some examples, aspects of the operations of 1820 may be performed by an uplink transmission manager as described with reference to FIGS. 8 through 11.

At 1825, the UE may transmit an indication of the adjusted traffic volume, where a size of the adjusted traffic volume limits the uplink transmission of the data based on the exposure threshold. The operations of 1825 may be performed according to the methods described herein. In some examples, aspects of the operations of 1825 may be performed by an uplink transmission manager as described with reference to FIGS. 8 through 11.

Figure 19:
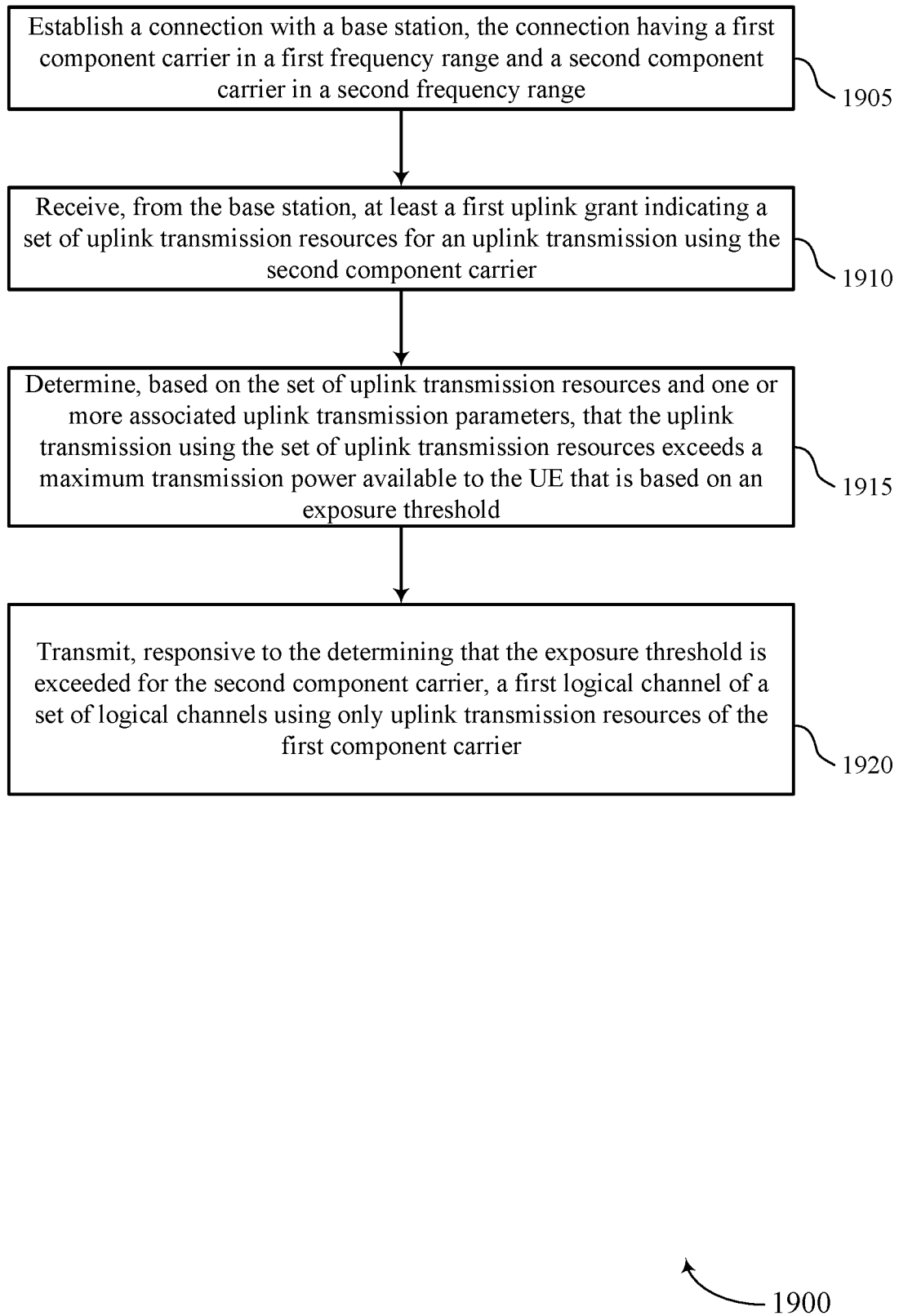

FIG. 19 shows a flowchart illustrating a method 1900 that supports uplink transmission techniques for exposure limited transmissions in accordance with aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 1905, the UE may establish a connection with a base station, the connection having a first component carrier in a first frequency range and a second component carrier in a second frequency range. The operations of 1905 may be performed according to the methods described herein. In some examples, aspects of the operations of 1905 may be performed by a connection establishment manager as described with reference to FIGS. 8 through 11.

At 1910, the UE may receive, from the base station, at least a first uplink grant indicating a set of uplink transmission resources for an uplink transmission using the second component carrier. The operations of 1910 may be performed according to the methods described herein. In some examples, aspects of the operations of 1910 may be performed by an uplink grant manager as described with reference to FIGS. 8 through 11.

At 1915, the UE may determine, based on the set of uplink transmission resources and one or more associated uplink transmission parameters, that the uplink transmission using the set of uplink transmission resources exceeds a maximum transmission power available to the UE that is based on an exposure threshold. The operations of 1915 may be performed according to the methods described herein. In some examples, aspects of the operations of 1915 may be performed by a power control manager as described with reference to FIGS. 8 through 11.

At 1920, the UE may transmit, responsive to the determining that the exposure threshold is exceeded for the second component carrier, a first logical channel of a set of logical channels using only uplink transmission resources of the first component carrier. In some cases, the first uplink grant indicates the first logical channel is to be transmitted at least partially using the second component carrier when the uplink transmission using the set of uplink transmission resources is within the maximum transmission power. The operations of 1920 may be performed according to the methods described herein. In some examples, aspects of the operations of 1920 may be performed by an uplink transmission manager as described with reference to FIGS. 8 through 11.

Figure 20:
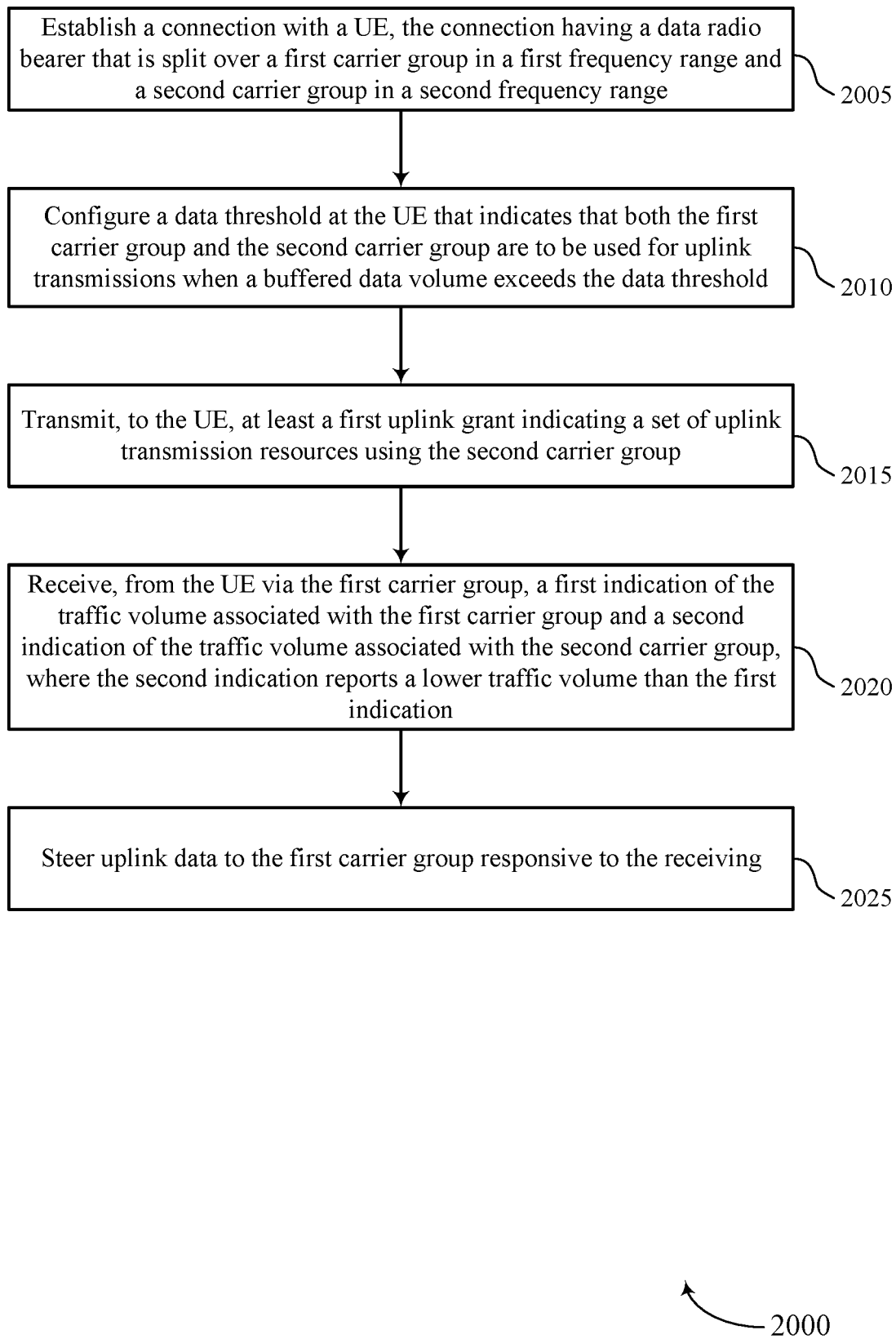

FIG. 20 shows a flowchart illustrating a method 2000 that supports uplink transmission techniques for exposure limited transmissions in accordance with aspects of the present disclosure. The operations of method 2000 may be implemented by a base station 105 or its components as described herein. For example, the operations of method 2000 may be performed by a communications manager as described with reference to FIGS. 12 through 15. In some examples, a base station may execute a set of instructions to control the functional elements of the base station to perform the functions described herein. Additionally or alternatively, a base station may perform aspects of the functions described herein using special-purpose hardware.

At 2005, the base station may establish a connection with a UE, the connection having a data radio bearer that is split over a first carrier group in a first frequency range and a second carrier group in a second frequency range. The operations of 2005 may be performed according to the methods described herein. In some examples, aspects of the operations of 2005 may be performed by a connection establishment manager as described with reference to FIGS. 12 through 15.

At 2010, the base station may configure a data threshold at the UE that indicates that both the first carrier group and the second carrier group are to be used for uplink transmissions when a buffered data volume exceeds the data threshold. The operations of 2010 may be performed according to the methods described herein. In some examples, aspects of the operations of 2010 may be performed by a carrier group manager as described with reference to FIGS. 12 through 15.

At 2015, the base station may transmit, to the UE, at least a first uplink grant indicating a set of uplink transmission resources using the second carrier group. The operations of 2015 may be performed according to the methods described herein. In some examples, aspects of the operations of 2015 may be performed by an uplink grant manager as described with reference to FIGS. 12 through 15.

At 2020, the base station may receive, from the UE via the first carrier group, a first indication of the traffic volume associated with the first carrier group and a second indication of the traffic volume associated with the second carrier group, where the second indication reports a lower traffic volume than the first indication. The operations of 2020 may be performed according to the methods described herein. In some examples, aspects of the operations of 2020 may be performed by an uplink control manager as described with reference to FIGS. 12 through 15.

At 2025, the base station may steer uplink data to the first carrier group responsive to the receiving. The operations of 2025 may be performed according to the methods described herein. In some examples, aspects of the operations of 2025 may be performed by an uplink grant manager as described with reference to FIGS. 12 through 15.

Figure 21:
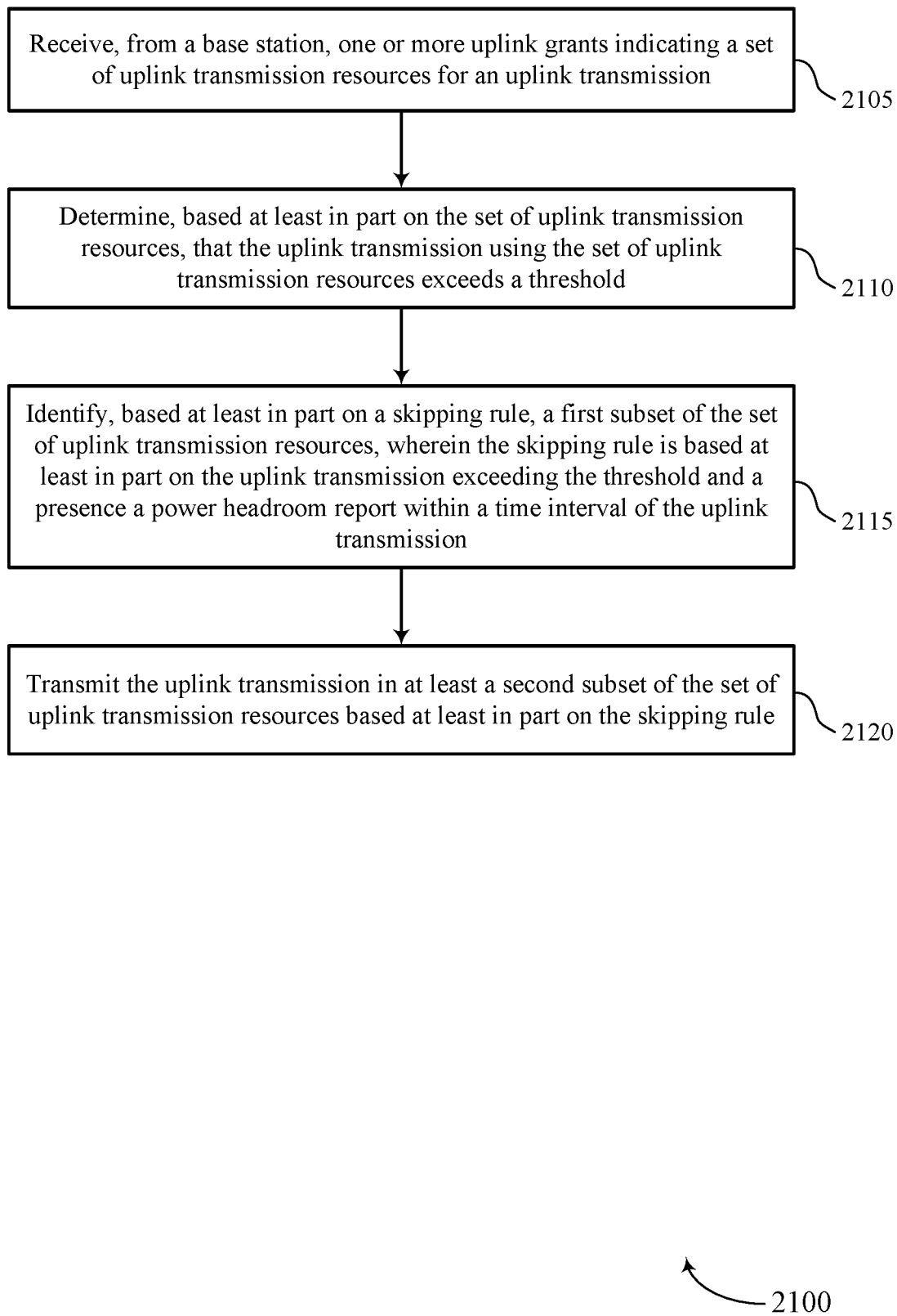

FIG. 21 shows a flowchart illustrating a method 2100 that supports uplink transmission techniques for exposure limited transmissions in accordance with aspects of the present disclosure. The operations of method 2100 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described herein. Additionally or alternatively, a UE may perform aspects of the functions described herein using special-purpose hardware.

At 2105, the UE may receive, from a base station, one or more uplink grants indicating a set of uplink transmission resources for an uplink transmission. The operations of 2105 may be performed according to the methods described herein. In some examples, aspects of the operations of 2105 may be performed by an uplink grant manager as described with reference to FIGS. 8 through 11.

At 2110, the UE may determine, based on the set of uplink transmission resources, that the uplink transmission using the set of uplink transmission resources exceeds a threshold. The operations of 2110 may be performed according to the methods described herein. In some examples, aspects of the operations of 2110 may be performed by an uplink transmission manager as described with reference to FIGS. 8 through 11.

At 2115, the UE may identify, based on a skipping rule, a first subset of the set of uplink transmission resources, where the skipping rule is based on the uplink transmission exceeding the threshold and a presence a power headroom report within a time interval of the uplink transmission. The operations of 2115 may be performed according to the methods described herein. In some examples, aspects of the operations of 2115 may be performed by an uplink transmission manager as described with reference to FIGS. 8 through 11.

At 2120, the UE may transmit the uplink transmission in at least a second subset of the set of uplink transmission resources based on the skipping rule. The operations of 2120 may be performed according to the methods described herein. In some examples, aspects of the operations of 2120 may be performed by an uplink transmission manager as described with reference to FIGS. 8 through 11.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UNITS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
    establishing a connection with a base station, wherein a first traffic volume at the UE comprises data to be transmitted to the base station;
    receiving, from the base station, a first uplink grant indicating a set of uplink transmission resources;
    determining, based at least in part on the set of uplink transmission resources and one or more associated uplink transmission parameters, that an uplink transmission of the data using the set of uplink transmission resources exceeds a maximum transmission power available to the UE that is based on an exposure threshold;
    calculating an adjusted traffic volume at the UE based at least in part on the set of uplink transmission resources and the data; and
    transmitting an indication of the adjusted traffic volume, wherein a size of the adjusted traffic volume limits the uplink transmission of the data based at least in part on the exposure threshold.

2. The method of claim 1, further comprising:
    identifying a time interval based at least in part on a trigger associated with the uplink transmission of the data using the set of uplink transmission resources exceeding the maximum transmission power available to the UE, wherein the adjusted traffic volume is calculated based at least in part on a duration of the time interval, the data to be transmitted to the base station, and the set of uplink transmission resources.

3. The method of claim 2, wherein calculating the adjusted traffic volume comprises:
    forming a first transport block with a portion of the data to be transmitted;
    subtracting, from the first traffic volume, a size of the portion of the data in the first transport block; and
    identifying, within the time interval, an end position for forming one or more additional transport blocks with the data based at least in part on the subtracting, wherein the first transport block comprises the indication of the adjusted traffic volume.

4. The method of claim 3, further comprising:
    refraining from forming the one or more additional transport blocks with a remaining portion of the data based at least in part on identifying the end position, wherein the one or more additional transport blocks are skipped until an end of the time interval or the one or more additional transport blocks are padded until the end of the time interval.

5. The method of claim 3, further comprising:
    padding the first transport block based at least in part on the size of the portion of the data.

6. The method of claim 1, wherein the size of the adjusted traffic volume is zero bytes.

7. The method of claim 1, wherein the connection has a radio bearer that is split over a first carrier group in a first frequency range and a second carrier group in a second frequency range, wherein the first traffic volume at the UE exceeds a data threshold that indicates both the first carrier group and the second carrier group are to be used for uplink transmissions, and wherein calculating the adjusted traffic volume at the UE comprises:
    calculating a first adjusted traffic volume associated with the first carrier group and a second adjusted traffic volume associated with the second carrier group.

8. The method of claim 7, further comprising:
    adjusting the data threshold based at least in part on the exposure threshold;
    determining that the first traffic volume at the UE exceeds the adjusted data threshold; and
    steering data traffic to the first carrier group or to the second carrier group based at least in part on the first traffic volume at the UE exceeding the adjusted data threshold.

9. The method of claim 7, wherein transmitting the indication of the adjusted traffic volume comprises:
    transmitting an indication of the first adjusted traffic volume and the second adjusted traffic volume, wherein one or both of the first adjusted traffic volume or the second adjusted traffic volume limits the uplink transmission of the data one the first carrier group or the second carrier group based at least in part on the exposure threshold.

10. The method of claim 9, further comprising:
    determining a medium access control (MAC) buffer size for each of the first carrier group and the second carrier group, wherein the first adjusted traffic volume and the second adjusted traffic volume are based at least in part on the MAC buffer size.

11. The method of claim 7, wherein the indication of the first adjusted traffic volume and the second adjusted traffic volume steers data traffic to the first carrier group.

12. The method of claim 7, wherein the first frequency range is a sub-6 GHz frequency range and the second frequency range is a millimeter wave frequency range.

13. An apparatus for wireless communication at a user equipment (UE), comprising:
    a processor;
    memory coupled with the processor; and
    instructions stored in the memory and executable by the processor to cause the apparatus to:
        establish a connection with a base station, wherein a first traffic volume at the UE comprises data to be transmitted to the base station;
        receive, from the base station, a first uplink grant indicating a set of uplink transmission resources;
        determine, based at least in part on the set of uplink transmission resources and one or more associated uplink transmission parameters, that an uplink transmission of the data using the set of uplink transmission resources exceeds a maximum transmission power available to the UE that is based on an exposure threshold;

calculate an adjusted traffic volume at the UE based at least in part on the set of uplink transmission resources and the data; and transmit an indication of the adjusted traffic volume, wherein a size of the adjusted traffic volume limits the uplink transmission of the data based at least in part on the exposure threshold.

14. The apparatus of claim 13, wherein the instructions are further executable by the processor to cause the apparatus to:

identify a time interval based at least in part on a trigger associated with the uplink transmission of the data using the set of uplink transmission resources exceeding the maximum transmission power available to the UE, wherein the adjusted traffic volume is calculated based at least in part on a duration of the time interval, the data to be transmitted to the base station, and the set of uplink transmission resources.

15. The apparatus of claim 14, wherein the instructions to calculate the adjusted traffic volume are executable by the processor to cause the apparatus to:

form a first transport block with a portion of the data to be transmitted;

subtract, from the first traffic volume, a size of the portion of the data in the first transport block; and identify, within the time interval, an end position for forming one or more additional transport blocks with the data based at least in part on the subtracting, wherein the first transport block comprises the indication of the adjusted traffic volume.

16. The apparatus of claim 15, wherein the instructions are further executable by the processor to cause the apparatus to:

refrain from forming the one or more additional transport blocks with a remaining portion of the data based at least in part on identifying the end position, wherein the one or more additional transport blocks are skipped until an end of the time interval or the one or more additional transport blocks are padded until the end of the time interval.

17. The apparatus of claim 15, wherein the instructions are further executable by the processor to cause the apparatus to:

pad the first transport block based at least in part on the size of the portion of the data.

18. The apparatus of claim 13, wherein the size of the adjusted traffic volume is zero bytes.

19. The apparatus of claim 13, wherein the connection has a radio bearer that is split over a first carrier group in a first frequency range and a second carrier group in a second frequency range, wherein the first traffic volume at the UE exceeds a data threshold that indicates both the first carrier group and the second carrier group are to be used for uplink transmissions, and wherein calculating the adjusted traffic volume at the UE comprises, and wherein the instructions to calculate the adjusted traffic volume at the UE are executable by the processor to cause the apparatus to:

calculate a first adjusted traffic volume associated with the first carrier group and a second adjusted traffic volume associated with the second carrier group.

20. An apparatus for wireless communication at a user equipment (UE), comprising:

means for establishing a connection with a base station, wherein a first traffic volume at the UE comprises data to be transmitted to the base station;

means for receiving, from the base station, a first uplink grant indicating a set of uplink transmission resources;

means for determining, based at least in part on the set of uplink transmission resources and one or more associated uplink transmission parameters, that an uplink transmission of the data using the set of uplink transmission resources exceeds a maximum transmission power available to the UE that is based on an exposure threshold;

means for calculating an adjusted traffic volume at the UE based at least in part on the set of uplink transmission resources and the data; and means for transmitting an indication of the adjusted traffic volume, wherein a size of the adjusted traffic volume limits the uplink transmission of the data based at least in part on the exposure threshold.

* * * * *